United States Patent [19]
Taguchi et al.

[11] Patent Number: 5,745,048
[45] Date of Patent: Apr. 28, 1998

[54] COMMUNICATION SYSTEM

[75] Inventors: Akemi Taguchi, Kariya; Masahito Hyodo, Anjo, both of Japan

[73] Assignee: Nippondenso Co., Ltd., Kariya, Japan

[21] Appl. No.: 726,755

[22] Filed: Oct. 7, 1996

Related U.S. Application Data

[63] Continuation of PCT/JP95/02406, Nov. 24, 1995.

[30] Foreign Application Priority Data

Feb. 9, 1995 [JP] Japan .................... 7-021642

[51] Int. Cl.$^6$ .................................... G08C 19/16
[52] U.S. Cl. .................... 340/870.01; 370/330; 364/132; 340/825.52
[58] Field of Search ............ 340/870.11, 870.07, 340/870.01, 870.16, 825.65, 825.52; 395/868; 370/330; 364/132

[56] References Cited

U.S. PATENT DOCUMENTS

| | | | |
|---|---|---|---|
| 5,166,678 | 11/1992 | Warrior | 340/870.15 |
| 5,184,121 | 2/1993 | Kogure et al. | 340/870.11 |
| 5,200,745 | 4/1993 | Takai et al. | 340/825.65 |
| 5,305,355 | 4/1994 | Go | 375/107 |
| 5,511,230 | 4/1996 | Rtu | 328/865 |
| 5,528,605 | 6/1996 | Ywoskus | 371/33 |
| 5,585,788 | 12/1996 | Hashimoto | 340/825.5 |

FOREIGN PATENT DOCUMENTS 0422507  4/1991  European Pat. Off. .
2-65599  3/1990  Japan .

*Primary Examiner*—Thomas Mullen
*Assistant Examiner*—Albert K. Wong
*Attorney, Agent, or Firm*—Cushman Darby & Cushman IP Group of Pillsbury Madison & Sutro LLP

[57] ABSTRACT

A master device sends a continuation (or stop) message on a communication line without causing mutual collision on the communication line with a response message continuously sent from a slave device. When time T1 has elapsed since completion of sending of a request message, a failure-diagnosis tester 5 (master) performs setting to send a continuation message when an idle counter has exceeded P3', and along with this, an engine controller 1 (slave) performs setting to send a subsequent response message when an idle counter has exceeded P2' (>P3'). Through this, the continuation message can be sent from the failure-diagnosis tester 5 prior to the engine controller 1 sending the subsequent response message, without causing the two messages to mutually collide on the communication line.

10 Claims, 14 Drawing Sheets

COMMUNICATION SYSTEM

This is a continuation of International Appln. No. PCT/JP95/02406 filed Nov. 24, 1995 which designated the U.S.

FIELD OF UTILIZATION IN INDUSTRY

The present invention relates to a communication system for performing data communication; for example, for diagnosis between a master device (an external device such as a tester) and a slave device (an electronic control device such as an engine controller or transmission controller).

PRIOR ART

Implementation of vehicle electronics in recent years has been remarkable, with vehicle-mounted devices in all areas of the vehicle, including the engine and transmission, undergoing a high level of implementation of electronics by microprocessors. For this reason, controllability of these vehicle-mounted devices has come to be elevated dramatically, but conversely, failure diagnosis of these vehicle-mounted devices has become increasingly complex.

For this reason, a self-diagnosis function has been added to many vehicle-mounted devices, and along with controlling the vehicle-mounted devices which are a target thereof, various modifications to support diagnosis of vehicle systems which are becoming increasingly more complex have been considered, such as improvement so that failure diagnosis of the vehicle-mounted device and control device is also performed, or alternatively, improvement of the system such as:

(a) taking these vehicle-mounted electronic control devices to be slave devices, commonly connecting these slave devices to an external device such as a master device, i.e., a failure diagnosis tester, and performing a higher degree of failure diagnosis and analysis of diagnosis data based on support by this failure diagnosis tester;

(b) forming a communication path among these vehicle-mounted electronic control devices which takes one to be a master and others to be slaves, and concentratedly performing failure diagnosis and the like for all other electronic control devices via this electronic control device which is the master.

As an incidental comment, there exist devices which perform one-to-one data communication, namely wherein the failure-diagnosis tester, as the communication system such as the foregoing (a), selects from among a plurality of vehicle-mounted electronic control devices one electronic control unit (hereinafter termed ECU 1) to be diagnosed, and along with this, sends a request message for diagnosis use to the ECU 1, and with respect to this, the ECU 1 continuously sends the latest data packet (a plurality of data) to the failure-diagnosis tester as a response message for the foregoing request message, and the failure-diagnosis tester performs diagnosis on the basis of this continuously sent data.

For example, a failure-diagnosis tester selects an engine control device (ECU 1) from among vehicle-mounted electronic control devices such as an engine controller, transmission controller, and the like, and along with this, sends a request message for diagnosis use to the engine control device, and with respect to this, the engine control device continuously sends a plurality of the latest data packets of engine revolving speed and vehicle speed to the failure-diagnosis tester as a response message for the foregoing request message, and the failure-diagnosis tester performs diagnosis on the basis of this continuously sent data.

Herein, in the above-described communication system, data communication between the failure-diagnosis tester and the ECU 1 is performed via a data line and connector. Herein, in a case where the connection of the foregoing connector was released after execution of operation of the ECU 1 was started on a basis of a request message from, for example, the failure-diagnosis tester, the ECU 1 has no device for detecting this released state, and so this state cannot be detected.

Consequently, the ECU 1 incorrectly recognizes that the failure-diagnosis tester is still connected, and as a result thereof, continues control operation immediately prior to disconnection of the connector. That is to say, the latest data packets are continued to be continuously sent to the failure-diagnosis tester.

In this regard, a device disclosed in Japanese Patent Publication Laid-Open No. Hei 3-124141 exists as a communication system for solving this problem. According to this system, the failure-diagnosis tester is caused to periodically send continuation request messages. Accordingly, when the ECU 1 receives a subsequent continuation request message within a predetermined time after completion of receiving the above-described continuation request message, the ECU 1 regards itself as being still connected to the failure-diagnosis tester and continues the above-described continuous sending. Conversely, when a subsequent continuation request message is not received even though the foregoing predetermined time has elapsed after completion of receiving the continuation request message, the foregoing connector is regarded as being disconnected, and the above-described continuous sending is stopped.

As an incidental comment, a communication line for sending a request message from the failure-diagnosis tester to the ECU 1 and a communication line for sending a response message from the ECU 1 to the failure-diagnosis tester are respectively independently provided in the above-described communication system. Consequently, regardless of the timing with which the foregoing continuation request message is sent, this continuation request message does not collide with the response message from the ECU 1 on the communication line.

However, in a case where the foregoing request message and response message are sent by the same communication line, when a continuation request message is sent at appropriate timing, such as in the above-described communication system, sending of a continuation request message from the failure-diagnosis tester may also occur when a response message is sent from the ECU 1, depending on the case, and these messages may collide on the communication line.

In this regard, in structuring a communication system which performs exchange of messages by a single communication line as was described above, free wait time (P2) from completion of sending of a request message until start of sending of an initial response message, free wait time (P2) from completion of sending of a particular response message until start of sending of a subsequent response message, and free wait time (P3) from completion of sending of a final response message until start of sending of a subsequent request message and so on are prescribed by international standard ISO 9141-2 so that the respective messages do not collide (see FIG. 16).

According to this international standard, the foregoing time P2 is prescribed to be 0 to 50 ms or 25 to 50 ms, and the foregoing time P3 is prescribed to be 55 ms to 5 s. That is to say, in the example of FIG. 16, when the failure-diagnosis tester has completed sending request message 1, the ECU 1 begins sending response message 1 not later than 50 ms later. Accordingly, when sending of response message 1 has been completed, the ECU 1 starts sending response message 2 not more than 50 ms later.

Additionally, the failure-diagnosis tester confirms that sending of response message 2 (in this case, this is the final response message) has been completed and the communication path has been in an open state for 55 ms or more, and thereafter starts sending request message 2 not more than 5 ms later.

However, when an attempt is made to apply the way of thinking of the above-described international standard without change to a communication system such as the foregoing which sends a continuation request message periodically from a failure-diagnosis tester on a single communication line, a problem as described below is produced.

Namely, with this foregoing international standard, in a case where there is a subsequently sent response message after sending a particular response message, sending of the subsequent response message is started after time P2 (not more than 50 ms later) after sending of the foregoing particular response message has been completed. Consequently, as shown in FIG. 17, when there are numerous response messages from the ECU 1, the communication path does not become open for the above-described time P3 (not more than 55 ms later) no matter how much time elapses, and as a result, the failure-diagnosis tester cannot send a continuation request message, no matter how much time elapses.

As a result thereof, a problem occurs wherein a continuation request message was not sent from the failure-diagnosis tester within the above-described predetermined time (T0 in FIG. 17) after completing receipt of request message 1, and so the ECU 1 erroneously recognizes the connection of the foregoing connector to have been released, and completes sending of the response message after this time T0.

Further, this problem occurs not only with regard to a system such as the foregoing (a), but also occurs similarly with regard to a system such as the foregoing (b).

Accordingly, in light of the foregoing problem, it is a first object of the present invention to provide a communication system which connects a master device and a slave device connected by a single communication line, wherein the master device is structured to send on the communication line a request message for causing a response message from the slave device to be continuously sent, and along with this, also to send, within a predetermined time from sending of this request message, a continuation message to cause the continuous sending to be continued; and the slave device is structured so that when the request message or the continuation message has been received, the slave device continuously sends the response message on the communication line within a predetermined time from this receipt, wherein further the master device can send the continuation message on the communication line without causing mutual collision with the continuously sent response message on the communication line.

Additionally, even with regard to a case where sending a stop request message to the ECU 1 via the failure-diagnosis tester is desired while the ECU 1 is continuously sending a response message, as was described above, it is prescribed in the foregoing international standard that this stop request message be sent after the foregoing time P3 from the completion of sending of the response message, and so if the communication path does not open for the time P3 (at least 55 ms or more) no matter how much time elapses, as was described above, a problem occurs wherein the stop message cannot be sent to the ECU 1.

Further, this problem as well occurs not only with regard to a system such as the foregoing (a), but also occurs similarly with regard to a system such as the foregoing (b).

Accordingly, in light of the foregoing problem, it is a second object of the present invention to provide a communication system which connects a master device and a slave device connected by a single communication line, wherein the master device is structured to send on the communication line a request message for causing a response message from the slave device to be continuously sent, and along with this, also to send, after sending this request message, a stop message to cause the continuous sending to be stopped; and the slave device is structured so that when the request message has been received, the slave device continuously sends the response message on the communication line within a predetermined time from this receipt, and along with this, stops the continuous sending when the stop message has been received, wherein further, the master device can send the stop request message on the communication line without causing mutual collision with the continuously sent response message on the communication line.

DISCLOSURE OF INVENTION

To achieve the foregoing first object, an invention according to claim 1 is a communication system, comprising:

a master device (5) and a slave device (1) connected by a transmissible bidirectional communication line (3), wherein:

the master device (5) is structured to send on the communication line (3) a request message for causing a response message from the slave device (1) to be continuously sent, and along with this, also to send, within a predetermined time (T0) from sending of this request message, a continuation message to cause the continuous sending to be continued; and the slave device (1) is structured so that when the request message or the continuation message has been received, the slave device (1) continuously sends the response message on the communication line (3) within a predetermined time (T0) from this receipt, wherein further:

the slave device (1) is structured so that at a time when the slave device (1) continuously sends the response message, the slave device (1) sends a subsequent response message after confirming that the communication line (3) has been continuously open for a first idle time (P2') or longer; and the master device (5) is structured to send the continuation message after confirming that the communication line (3) has been continuously open for not less than a second idle time (P3') which is shorter than the first idle time (P2').

Further, an invention according to claim 2 is a communication system according to claim 1, wherein:

the slave device (1) comprises:

a device for determining a first idle time (step 338) to determine whether the communication line (3) has been continuously open for the first idle time (P2') or longer; and a device for response-message sending (step 339) to send the subsequent response message when it has been determined by this device for determining first idle time (step 338) that the communication line (3) has been open for the first idle time (P2') or longer, wherein further:

the master device (5) comprises:

a device for determining elapsed time (step 219) to determine whether not less than a second predetermined time (T1) which is shorter than the predetermined time (T0) has elapsed after completion of sending the request message or the continuation message;

a device for setting a reference value (step 220) to set a reference value for determining open time of the communication line (3) to the second idle time (P3') after it has been determined by this elapsed-time determining device (step 219) that the second predetermined time (T1) or longer has elapsed;

a device for determining second idle time (step 222) to determine whether the communication line (3) has been continuously open for the reference value (P3') or more; and a device for continuation-message sending (step 223) to send the continuation message after it has been determined by this device for determining second idle time (step 222) that the communication line (3) has been continuously open for the reference value (P3') or more.

Further, an invention according to claim 3 is a communication system according to claim 1, wherein:

the slave device (1) comprises:

a device for determining elapsed time (step 342) to determine whether not less than a second predetermined time (T1) which is shorter than the predetermined time (T0) has elapsed after completion of sending the request message or the continuation message;

a device for setting a reference value (step 336) to set a reference value for determining open time of the communication line (3) to the first idle time (P2') after it has been determined by this elapsed-time determining device (step 342) that the first predetermined time (T0) or longer has elapsed;

a device for determining first idle time (step 338) to determine whether the communication line (3) has been continuously open for the reference value or more; and a device for response-message sending (step 339) to send the subsequent response message when it has been determined by this device for determining first idle time (step 338) that the communication line (3) has been open for the first idle time (P2') or longer, wherein further:

the master device (5) comprises:

a device for determining second idle time (step 222) to determine whether the communication line (3) has been continuously open for the reference value (P3') or more; and a device for continuation-message sending (step 223) to send the continuation message after it has been determined by this device for determining second idle time (step 222) that the communication line (3) has been continuously open for the second idle time (P3') or more.

Further, to achieve the foregoing second object, an invention according to claim 4 is a communication system, comprising:

a master device (5) and a slave device (1) connected by a transmissible bidirectional communication line (3), wherein:

the master device (5) is structured to send on the communication line (3) a request message for causing a response message from the slave device (1) to be continuously sent, and along with this, also to send, after sending this request message, a stop message to cause the continuous sending to be stopped; and the slave device (1) is structured so that when the request message has been received, the slave device (1) continuously sends the response message on the communication line (3) within a predetermined time (T0) from this receipt, and along with this, stops the continuous sending when the stop message has been received, wherein further:

the slave device (1) is structured so that at a time when the slave device (1) continuously sends the response message, the slave device (1) sends a subsequent response message after confirming that the communication line (3) has been continuously open for a first idle time (P2') or longer; and the master device (5) is structured to send the stop message after confirming that the communication line (3) has been continuously open for not less than a second idle time (P3') which is shorter than the first idle time (P2').

Further, an invention according to claim 5 is communication system according to claim 4, wherein:

the slave device (1) comprises:

a device for determining first idle time (step 338) to determine whether the communication line (3) has been continuously open for the first idle time (P2') or longer; and a device for response-message sending (step 339) to send the subsequent response message when it has been determined by this device for determining first idle time (step 338) that the communication line (3) has been open for the first idle time (P2') or longer, wherein further:

the master device (5) comprises:

a device for determining second idle time (step 222) to determine whether the communication line (3) has been continuously open for the second idle time (P3') or longer; and a device for stop-message sending (step 223) to send the stop message after it has been determined by this device for determining second idle time (step 222) that the communication line (3) has been continuously open for the second idle time (P3') or longer.

Further, an invention according to claim 6 is a communication system according to any one of claims 1 through 5, wherein further:

a plurality of the slave devices are provided;

the master device (5) is structured to select from among this plurality of slave devices (1 and 2) a desired slave device (1), and along with this, to send the request message or the continuation message or the stop message to this selected slave device (1); and the selected slave device (1) is structured to continuously send the response message.

Additionally, symbols in parentheses for the foregoing several means indicate a corresponding relationship with specific means of embodiments which will be described later.

According to the invention recited in claim 1, when the master device sends the request message on the communication line, when the slave device receives this request message, the slave device continuously sends a response message on the communication line for a predetermined time from this receipt.

Herein, the slave device is performs the continuous sending in a mode wherein at a time when the slave device continuously sends the response message on the communication line, the slave device sends a subsequent response message when the communication line has been continuously open for the first idle time or longer after a particular response message has been sent. In contrast thereto, the master device is structured to send the continuation message when the communication line has been opened for the second idle time which is shorter than the first idle time.

In this way, because the second idle time as the timing with which the master device sends the continuation message is shorter than the first idle time as the timing with which the slave device sends the subsequent response message, at the time when the master device sends the continuation message within the predetermined time from the sending of the request message, the master device can send the continuation message prior to the slave device sending the subsequent response message.

Consequently, even in a case where the communication line connecting the master device and slave device is made up of a single line, the master device can send the continuation message on the communication line within the predetermined time from the sending of the request message, without causing the foregoing two messages to collide on this communication line.

Additionally, the invention according to claim 2 is a more specific embodiment of the invention as recited in claim 1, and according to this invention, when it has been determined by the elapsed-time determining device that the second predetermined time or longer has elapsed since the master device has completed sending the request message or continuation message, the reference-value setting device of the master device sets the reference value to the second idle time (<first idle time).

Accordingly, as for the master device, when it has been determined by the device for determining second idle time that the communication line has been continuously open for the reference value (=second idle time) or longer, the continuation-message sending device sends the continuation message. In contrast thereto, as for the slave device, when it has been determined by the device for determining first idle time that the communication line has been continuously open for the first idle time (>second idle time) or longer, the response-message sending device sends the subsequent response message.

In this way, when the second predetermined time has elapsed after request-message sending from the master device has been completed, the master device sets the reference value, as the timing with which the continuation message is sent, to the second idle time, which is shorter than the first idle time as the timing with which the slave device sends the subsequent response message, and so the master device can send the continuation message prior to the slave device sending the subsequent response message.

Additionally, the invention according to claim 3 also is a more-specific embodiment of the invention as recited in claim 1, and according to this invention, when it has been determined by the elapsed-time determining device that the second predetermined time or longer has elapsed since the master device has completed sending the request message or continuation message, the reference-value setting device of the slave device sets the reference value to the first idle time (>second idle time).

Accordingly, as for the slave device, when it has been determined by the device for determining first idle time that the communication line has been continuously open for the reference value (=first idle time) or longer, the response-message sending device sends the subsequent response message. In contrast thereto, as for the master device, when it has been determined by the device for determining second idle time that the communication line has been continuously open for the second idle time (<first idle time) or longer, the continuation-message sending device sends the continuation message.

In this way, when the second predetermined time has elapsed after request-message sending from the master device has been completed, the slave device sets the reference value, as the timing with which the subsequent response message is sent, to the first idle time, which is longer than the second idle time as the timing with which the master device sends the continuation message, and so the master device can send the continuation message prior to the slave device sending the subsequent response message.

Additionally, in a case of the invention as recited in claim 4, because the second idle time as the timing with which the master device sends the stop message is shorter than the first idle time as the timing with which the slave device sends the subsequent response message, the master device can send the stop message prior to the slave device sending the subsequent response message.

Consequently, even in a case where the communication line connecting the master device and slave device is made up of a single line, the master device can send the stop message on the communication line without causing the foregoing two messages to mutually collide on this communication line.

Additionally, the invention according to claim 5 is a more specific embodiment of the invention as recited in claim 4, and according to this invention, as for the slave device, when it has been determined by the device for determining first idle time that the communication line has been continuously open for the first idle time or longer, the response-message sending device sends the subsequent response message. In contrast thereto, as for the master device, when it has been determined by the device for determining second idle time that the communication line has been continuously open for the second idle time (<first idle time) or longer, the stop-message sending device sends the stop message.

In this way, because the second idle time as the timing with which the master device sends the stop message is shorter than the first idle time as the timing with which the slave device sends the subsequent response message, the master device can send the stop message prior to the slave device sending the subsequent response message.

Additionally, in the invention as recited in claim 6, a plurality of slave devices exist, but the master device selects a desired slave device from among this plurality of slave devices and performs exchange of the several messages between the master device and this selected slave device as in the inventions of the above-described claims 1 through 5.

BEST MODE FOR CARRYING OUT THE INVENTION

A first embodiment based on the invention recited in claim 1, 2, or 4 through 6, in which the present invention is applied to a vehicle diagnosis system, will be described next with reference to FIG. 1 through FIG. 11.

Figure 1:
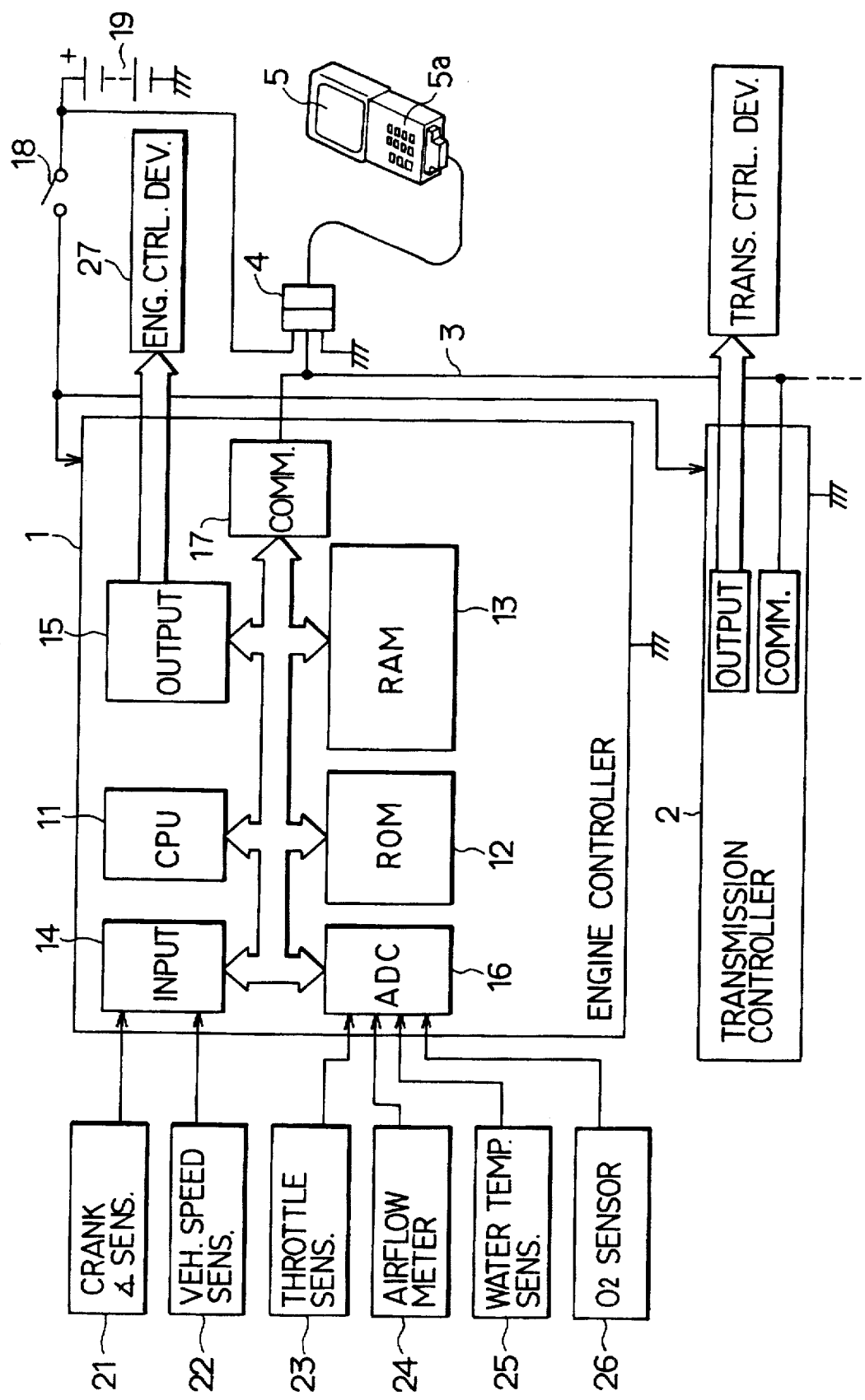
FIG. 1 is an overall structural view of first and second embodiments of the present invention.

In the system of the present embodiment, as shown in FIG. 1, a plurality of electronic control units (engine controller 1, transmission controller 2, and so on) as slave devices mounted on a vehicle and a failure-diagnosis tester 5 as an externally-mounted master device are connected via a single communication line 3 and diagnosis connector 4.

Further, a protocol conforming to international standard ISO 9141-2 is utilized between this connected failure-diagnosis tester 5 and the foregoing vehicle-mounted electronic controllers as a communication method thereof. These several elements will be described in detail hereinafter. Herein, the engine controller 1 will be taken as representative of an example of a vehicle-mounted electronic controller, and structure and functions thereof will be described.

The engine controller 1 is structured having respectively a CPU 11, ROM 12, RAM 13, input circuit 14, output circuit 15, A/D conversion circuit (hereinafter termed "ADC circuit") 16, communication circuit 17, and so on. Herein, the communication circuit 17 is an input/output buffer circuit for driving the communication line 3.

Additionally, sensor signals made up primarily of pulse signals output from sensors such as a sensor for detecting engine rotational speed (specifically, a crank-angle sensor) 21, vehicle-speed sensor 22, and so on are input to the input circuit 14, and sensor signals made up of analog signals output from sensors such as a throttle sensor 23, airflow meter 24, water-temperature sensor 25, $O_2$ sensor 26, and so on provided in several locations of the vehicle are input to the ADC circuit 16.

Each of these signals is stored in a data region of the RAM 13 as sensor data corresponding to a detected value thereof, and is utilized as an operational value for calculation of fuel injection quantity and ignition timing by the CPU 11. Further, memory regions for several counters, several buffers, several execution flags, and the like, which will be described later, are respectively formed in the RAM 13 in addition to the above-described data region.

Additionally, the CPU 11 is a portion which executes, in accordance with a control program previously stored in the ROM 12, predetermined computation on a basis of sensor data taken into the RAM 13, determining fuel-injection quantity and ignition timing at that time, and along with this, exchanges of communication messages which will be described later with the failure-diagnosis tester 5, and executes specified failure diagnosis via these messages.

Further, the fuel-injection quantity determined via this CPU 11 is given to the output circuit 15 and passes through this output circuit 15, and the above-described signal corresponding to the determined fuel-injection quantity is output to an engine-control device 27. A fuel-injection valve, for example, exists as the engine-control device 27.

Meanwhile, the failure-diagnosis tester 5 also has a structure including a CPU, ROM, RAM, communication circuit, and so on, similar to the above-described electronic controller. Accordingly, when a predetermined diagnosis mode has been established via a control device 5a (specifically, a keyboard) disposed on the outer surface of the failure-diagnosis tester 5, a request message (which will be described later) corresponding to this diagnosis mode is sent to the several electronic controllers via the diagnosis connector 4.

Moreover, in the failure-diagnosis tester 5, a diagnostician can be informed of the content of a response message (which will be described later) corresponding to the foregoing request message as diagnostic results by a list display, graphical display, or the like on a display device (not shown).

Additionally, a power source is supplied from a battery 19 to the diagnosis connector 4 via an ignition switch 18, and when the failure-diagnosis tester 5 is electrically connected to the vehicle-mounted electronic controller in this way, the power source is supplied to the failure-diagnosis tester 5 as well via this diagnosis connector 4.

In the communication system of the present embodiment, the failure-diagnosis tester 5 selects one from among the above-described several electronic controllers, and along with this, sends a request message to this selected controller and in contrast thereto, the foregoing selected controller continuously sends the latest data packet (a plurality of data) to the failure-diagnosis tester 5 as a response message corresponding to the foregoing request message, and the failure-diagnosis tester 5 performs latest data-packet continuous-sending diagnosis processing which is one-to-one data communication in the form of performing diagnosis of the foregoing selected controller on the basis of this continuously sent data.

Figure 2:
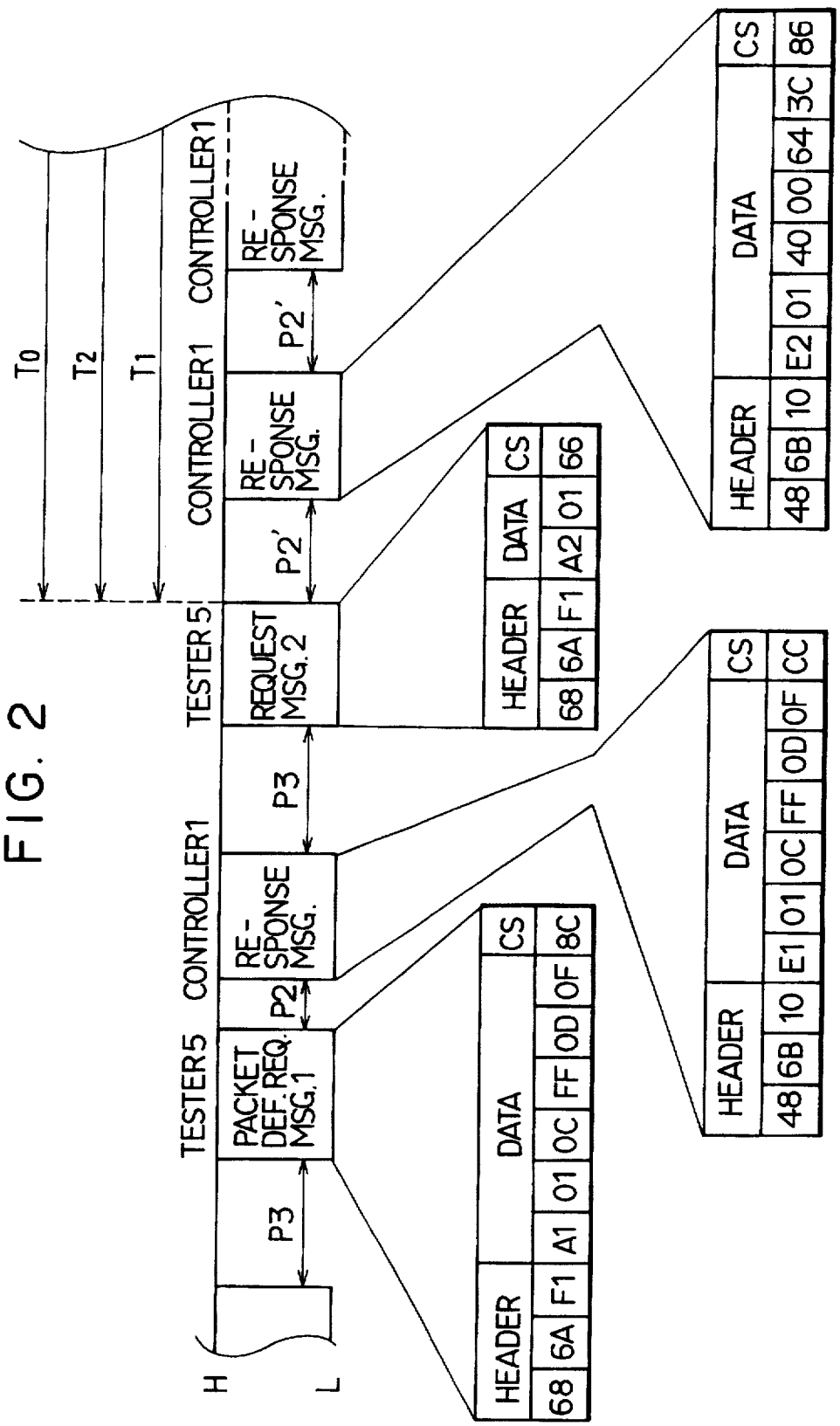
FIG. 2 is a time chart showing overall flow of latest data-packet continuous-sending diagnosis processing of the first embodiment.
Figure 3:
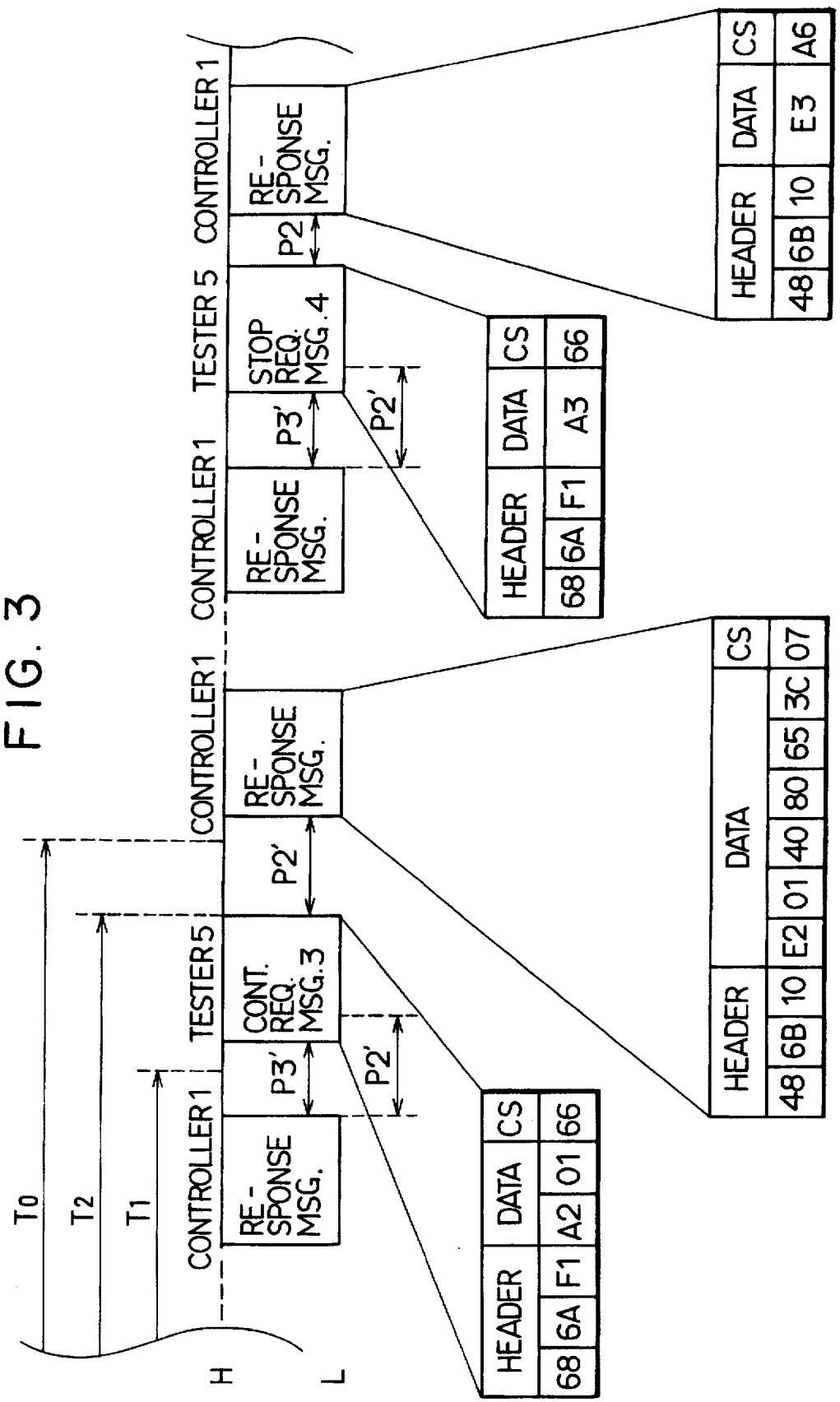
FIG. 3 is a time chart showing overall flow of latest data-packet continuous-sending diagnosis processing of the first embodiment.
Figure 4:
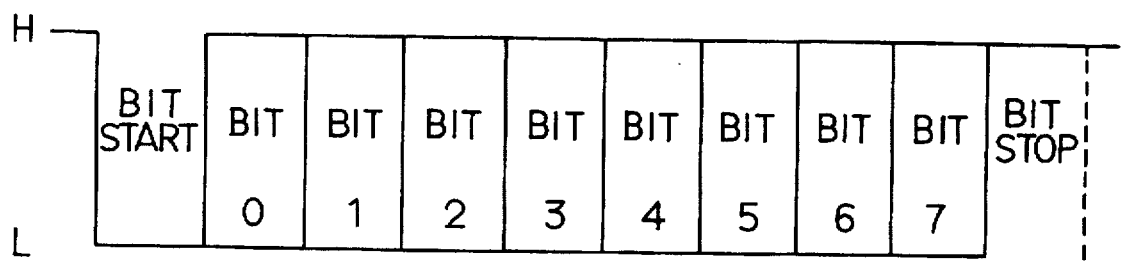
FIG. 4 is a time chart showing a bit format of the several bytes making up the several messages of the first and second embodiments.
Figure 16:
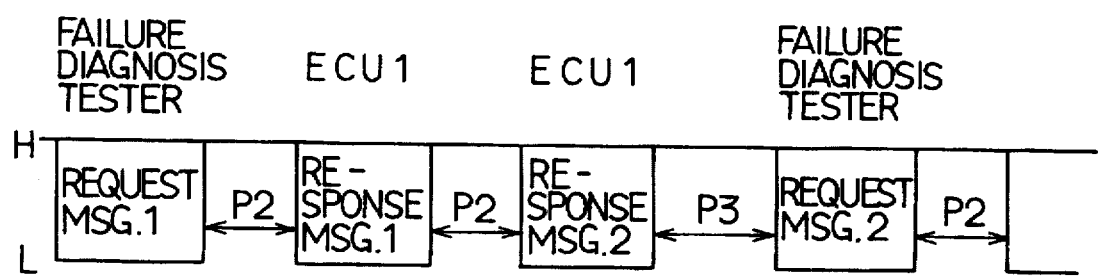
FIG. 16 is a time chart showing a communication procedure according to international standard ISO 9141-2.

Overall flow of this latest data-packet continuous-sending diagnosis processing is shown in FIG. 2 and FIG. 3 as time charts. A case where the foregoing selected controller is the engine controller 1 will be described herein. Moreover, a NRZ (non-return zero) method using 8 bits such as is shown in FIG. 4 is adopted for the bit format of the several bytes making up the several messages which will be described hereinafter. Accordingly, a logical L (low) level start bit at the start thereof, and a logical H (high) level stop bit at the end thereof are respectively appended, so that existence of these bytes may be confirmed.

When an operator operates the keyboard 5a and establishes a latest data-packet mode to perform latest data-packet continuous-sending diagnosis of the engine controller 1, the failure-diagnosis tester 5 sends a request message 1 to request continuous sending of the latest data packet.

Further, as shown in FIG. 2,

"Information that this message is a request message ($68),"
"Information that the destination of this message is the engine controller 1 ($6A),"

"Information that the origin of this message is the failure-diagnosis tester 5 ($F1),"

and so on is incorporated in the header 3 bytes of this request message 1.

Additionally,

"Mode display ($A1) to request latest data-packet definition,"

"Data-packet ID ($01) to request setting as desired of data to be sent,"

"Parameter IDs to respectively request engine revolving speed ($0C and $FF), vehicle speed ($0D), and intake-air temperature ($0F),"

are incorporated in data bytes subsequent thereto, and finally a checksum (hereinafter termed "CS") is appended thereto.

Meanwhile, after time P2 (according to the present embodiment, 28 ms) from completion of receipt of this request message 1, the engine controller 1 starts to send a response message indicating that the latest data packet is being defined. That is to say, a start bit of the foregoing response message is sent after time P2 from completion of the CS stop bit of request message 1.

Further,

"Information that this message is a response message ($48)"

"Information that the destination of this message is the failure-diagnosis tester 5 ($6B),"

"Information that the origin of this message is the engine controller 1 ($10),"

and so on is incorporated in the header 3 bytes of this response message.

Additionally,

"Mode display ($E1) to execute latest data-packet definition,"

"Data-packet ID ($01) to request setting as desired of data to be sent,"

"Parameter IDs to respectively indicate engine revolving speed ($0C and $FF), vehicle speed ($0D), and intake-air temperature ($0F),"

are incorporated in data bytes subsequent thereto, and finally a checksum is appended.

Accordingly, after time P3 (according to the present embodiment, 55 ms) from completion of receipt of the foregoing response message, the failure-diagnosis tester 5 sends request message 2 to request a start of latest data-packet continuous sending. That is to say, a start bit of the foregoing request message 2 is sent after time P3 from completion of the CS stop bit of response message.

Further, data identical to the header 3 bytes of the foregoing request message 1 is incorporated in the header 3 bytes of this request message 2.

Additionally,

"Mode display ($A2) to request continuous sending of the latest data-packet definition,"

"Data-packet ID ($01) to request setting as desired of data to be sent,"

are incorporated in data bytes subsequent thereto, and finally a checksum is appended thereto.

Accordingly, after time P2' (according to the present embodiment, 40 ms) from completion of receipt of this request message 2, the engine controller 1 starts to send an initial response with respect to this request message. That is to say, a start bit of the foregoing initial response message is sent after time P2' from completion of the CS stop bit of request message 2.

Further, data identical to the header 3 bytes of the above-described response message is incorporated in this the header 3 bytes of response message.

Additionally,

"Mode display ($E1) to execute continuous sending of the latest data-packet,"

"Data-packet ID ($01) to request setting as desired of data to be sent,"

"Parameter IDs to respectively indicate actual engine revolving speed ($4000, indicating 4,096 rpm as a physical quantity), actual vehicle speed ($64, indicating 100 km/h as a physical quantity)), and actual intake-air temperature ($3C, indicating 20° C. as a physical quantity),"

are incorporated in data bytes subsequent thereto, and finally a checksum is appended thereto.

Thereafter, the engine controller 1 opens for an interval of time P2' as shown in FIG. 2, and as described above, continuously sends the response message incorporating the latest data for engine revolving speed, vehicle speed, and intake-air temperature to the failure-diagnosis tester 5.

Meanwhile, when a predetermined time T1 (<T0) has elapsed since completion of sending of the previous request message, the failure-diagnosis tester 5 confirms that an opened state (a state wherein the communication line 3 is logically H for a uniform time or longer) of the communication line 3 has continued for time P3', and sends continuation request message 3 as shown in FIG. 3. According to the present embodiment, this continuation request message 3 is taken to be identical with request message 2. Additionally, the foregoing time P3' is established to be a time shorter than the foregoing time P2', and according to the present embodiment, is 30 ms.

Figure 17:
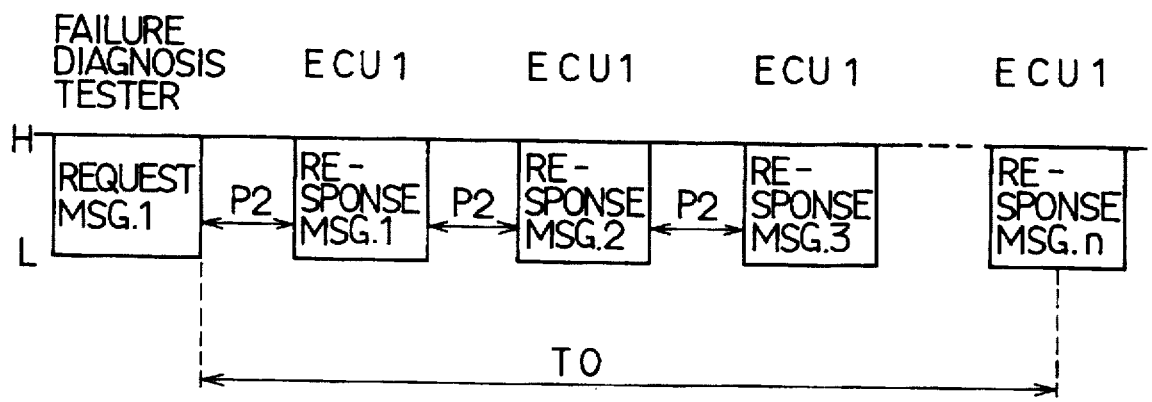
FIG. 17 is a time chart showing a communication sequence in a case where a way of thinking of the foregoing international standard has been applied to latest data-packet continuous-sending processing.

Further, according to the present embodiment, when continuation request message 3 has been sent by the above-described method, time after completion of sending of request message 2 until completion of sending of continuation request message 3 (this is taken to be T2) is established to become shorter than time T0 shown in FIG. 17. That is, by establishing time T1 with this way of thinking, a subsequent continuation request message is sent within the foregoing time T0, and because of this, the engine controller 1 can continue continuous sending of the response message.

Meanwhile, when the engine controller 1 has received the foregoing continuation request message 3, the engine controller 1 clears a counter (a timeout counter which will be described later in connection with step 317) for measuring the foregoing time T0, and along with this, restarts the foregoing continuous sending.

Additionally, when the operator operates the keyboard 5a and establishes a mode for stopping the latest data-packet continuous-sending diagnostic processing of the engine controller 1, the failure-diagnosis tester 5 sends stop request message 4 to request stopping of the latest data-packet continuous sending. In this case, stop request message 4 is sent after time P3' since completion of sending of the response message from the engine controller 1, similarly to continuation request message 3.

Moreover, data identical to the header 3 bytes of the foregoing request message 2 is incorporated in the header 3 bytes of this stop request message 4.

Accordingly,

"Mode display ($A3) to request stopping of continuous sending of the latest data-packet"

is incorporated in a data byte subsequent thereto, and finally a checksum is appended.

After time P2 after receiving this stop request message 4, the engine controller 1 sends only one response message with respect to this stop request message 4.

Further, data identical to the header 3 bytes of the foregoing several response messages is incorporated in the header 3 bytes of this response message.

Accordingly,
"Mode display ($E3) to stop continuous sending of the latest data-packet"
is incorporated in a data byte subsequent thereto, and finally a checksum is appended.

Additionally, when a connection of the diagnosis connector 4 has been disconnected during execution of the foregoing latest data-packet continuous-sending diagnosis processing, the failure-diagnosis tester 5 continues without change to periodically send the continuation request message, but the engine controller 1 does not receive the continuation request message because the diagnosis connector 4 has been disconnected. Consequently, continuous sending of the response message is halted at this time because the engine controller 1 does not receive the subsequent continuation request message within the foregoing time T0.

Overall flow of latest data-packet continuous-sending diagnosis processing according to the present embodiment was described hereabove with reference to FIG. 2 and FIG. 3, but specific means for performing this above-described processing will be described hereinafter with reference to FIG. 5 through FIG. 11.

Figure 5:
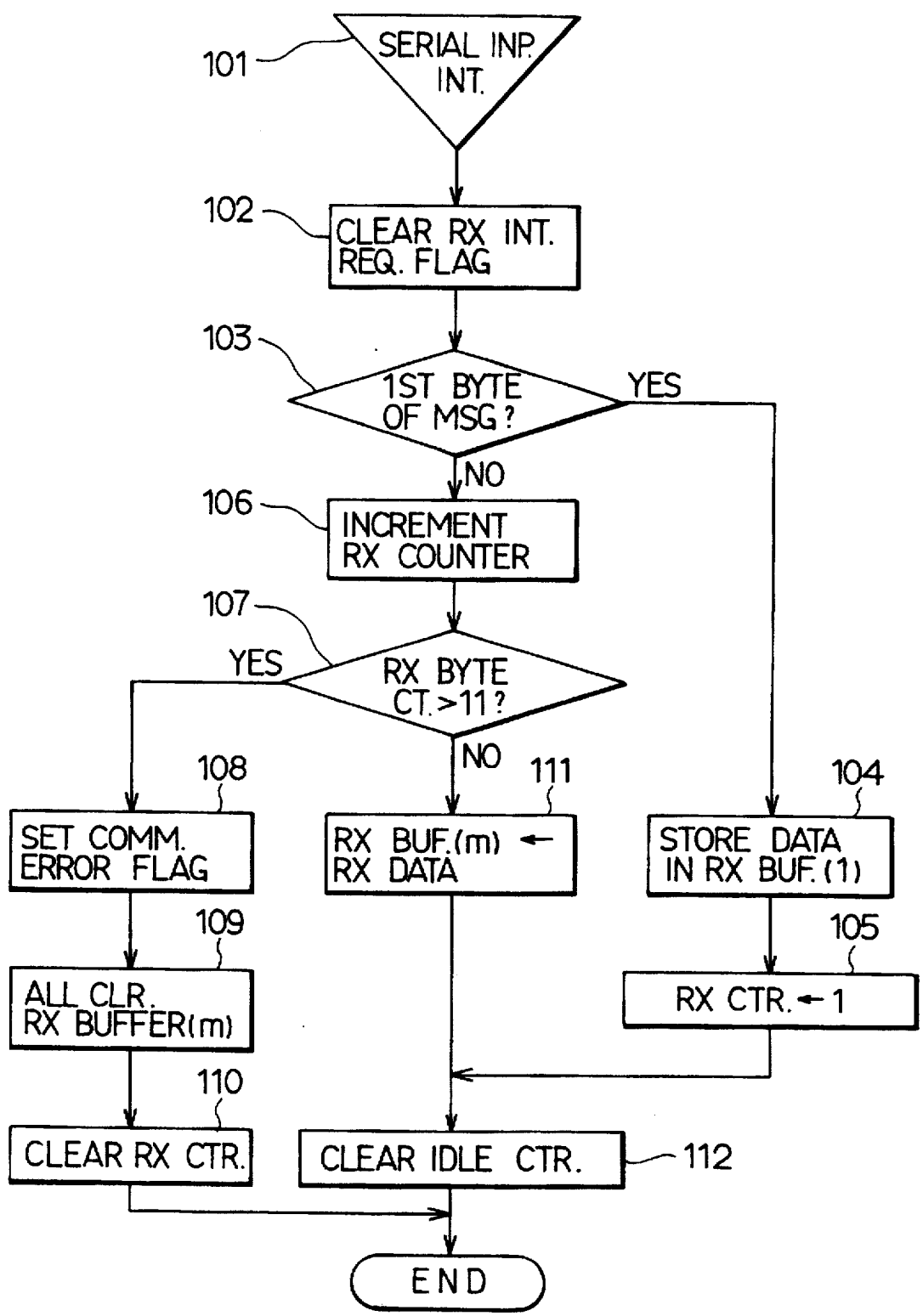
FIG. 5 is a flowchart showing serial-input interrupt processing of the first and second embodiments.
Figure 6:
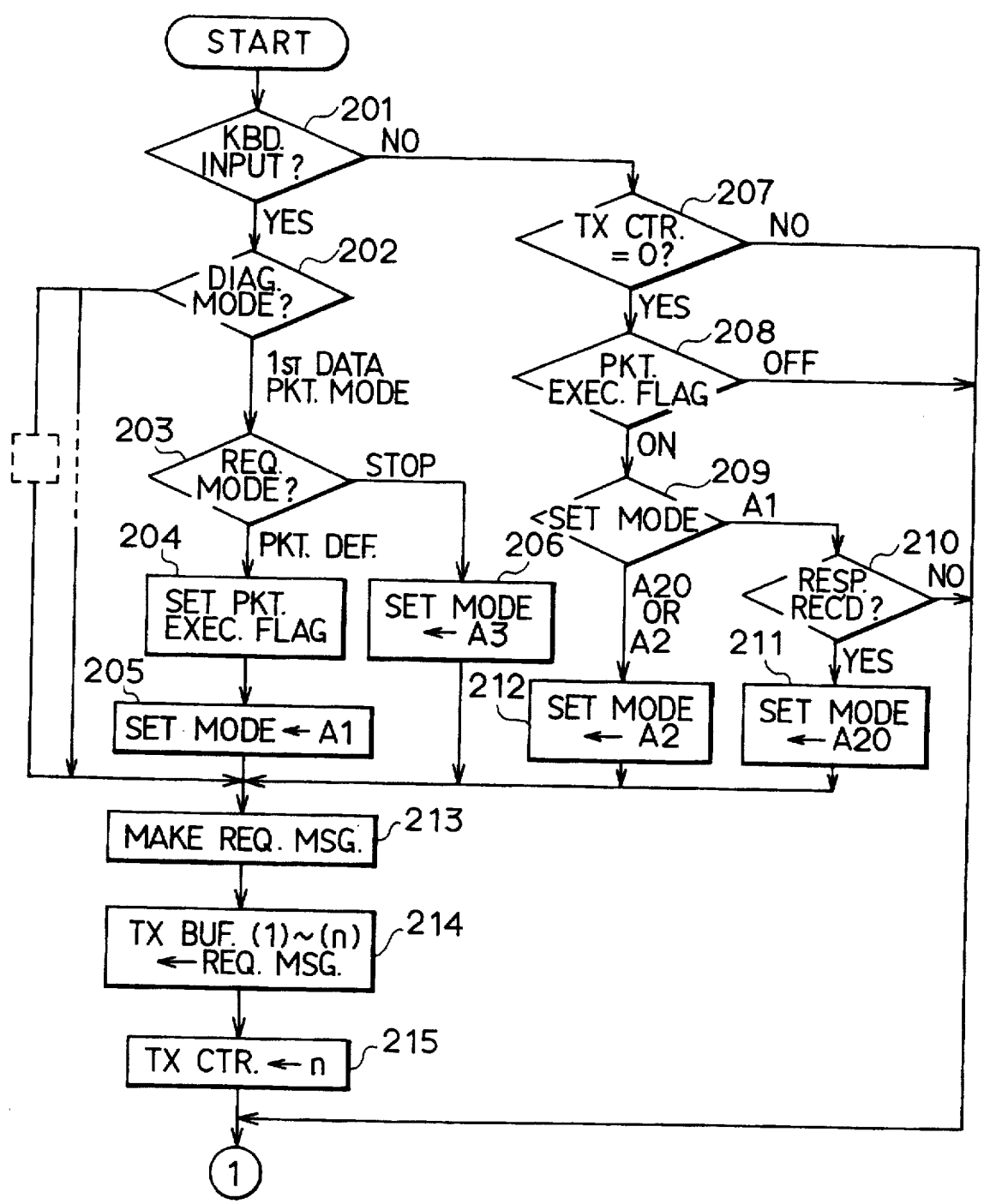
FIG. 6 is a flowchart showing a main routine on the master side of the first and second embodiments.
Figure 7:
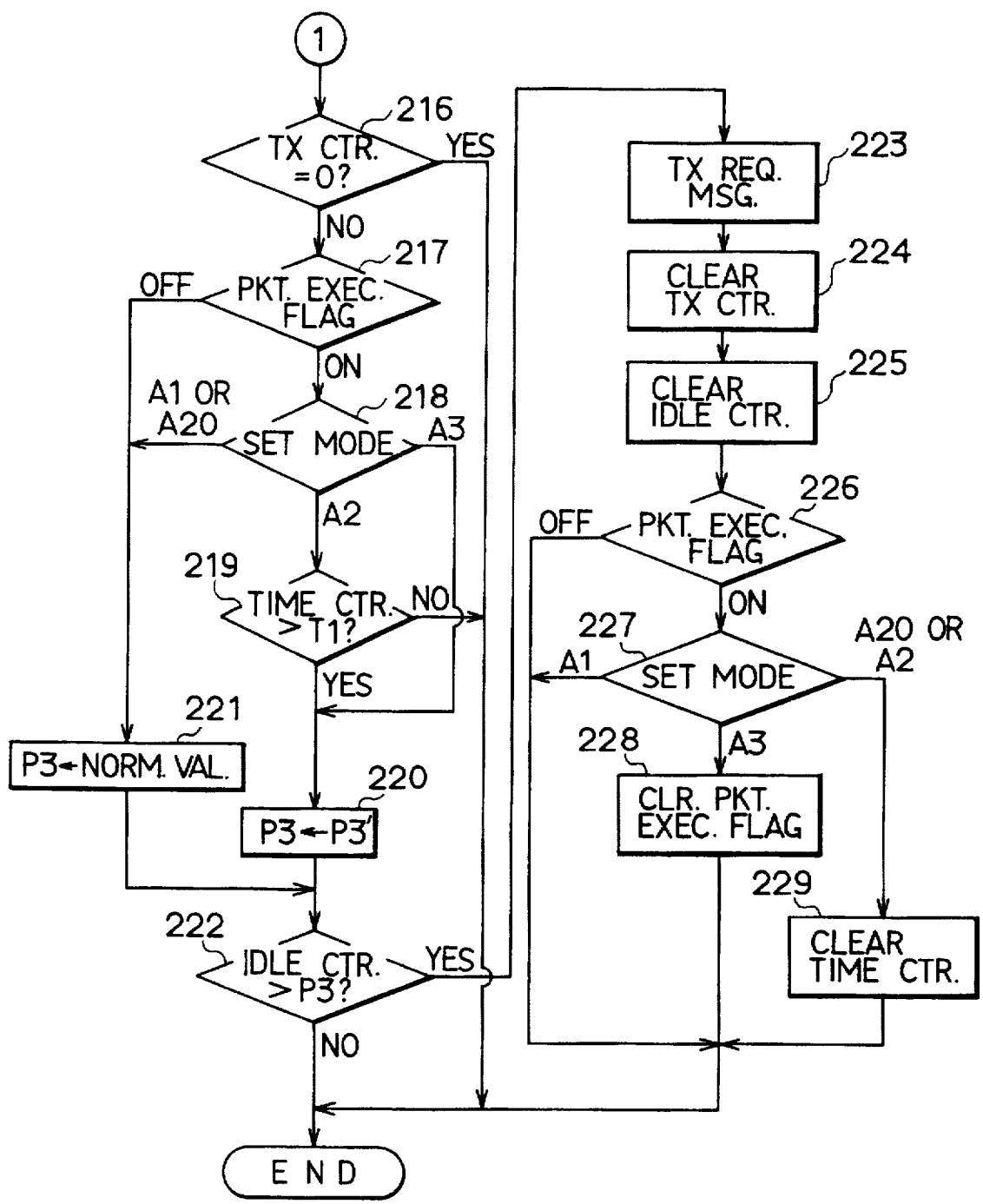
FIG. 7 is a flowchart showing the main routine on the master side of the first embodiment.
Figure 8:
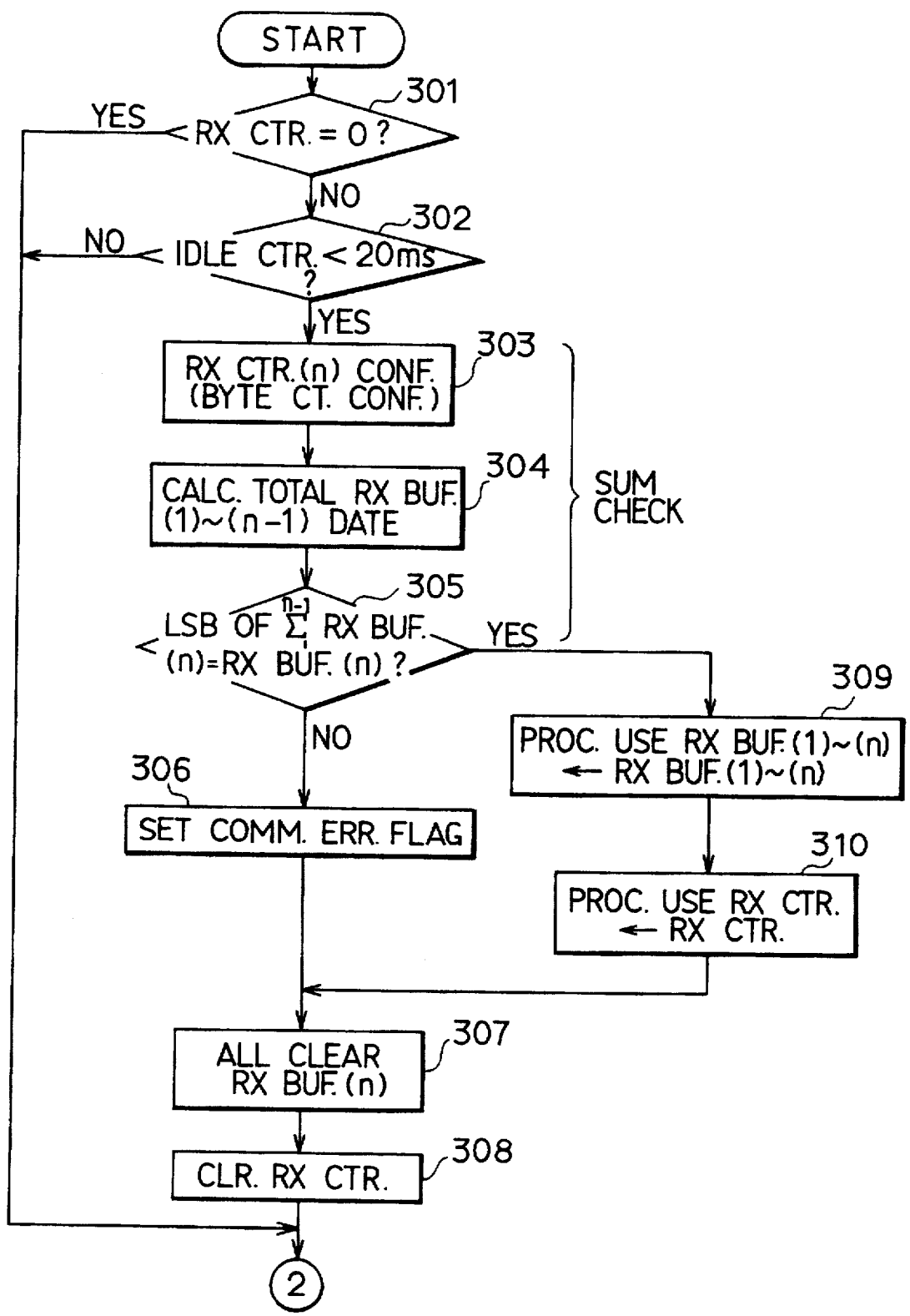
FIG. 8 is a flowchart showing a main routine on the slave side of the first and second embodiments.

Firstly, sending processing of request messages 1 through 4 (FIGS. 2 and 3) at the failure-diagnosis tester 5 will be described with reference to FIG. 5 through FIG. 7. Further, FIG. 5 is a flowchart showing interrupt processing realized through a serial-input interrupt function of the CPU for reliably taking in a response message from the slave device for which timing of sending is not known, and FIGS. 6 and 7 are a flowchart showing a main routine which is activated on every base loop.

As an incidental comment, this serial-input interrupt function is activated in step 101 each time that receipt of a byte of a message from the slave device is completed, and in step 102, the failure-diagnosis tester 5 clears a receipt interrupt request flag and prepares to accept a receipt interrupt of the subsequent byte. Accordingly, in step 103, it is determined whether the received byte is the first byte of the message, and if determined to be the first byte, in step 104 the received data thereof is stored in the receiving buffer (1).

Accordingly, in step 105, the receiving counter is set to 1, and in the subsequent step 112, an idle counter for measuring continuous time of an open state of the communication line 3 is cleared, and this interrupt processing is exited.

Further, this idle counter is incremented by one in correspondence with a time interrupt (for example a 2 ms interrupt) by a timer (not shown).

Additionally, if the determination result of step 103 is the second byte or after, in step 106 the receiving counter is incremented and employed as information to determine the number of the present byte. Accordingly, in step 107, it is determined based on the receiving counter whether the number of presently received bytes exceeds 11 and considered to be an abnormality if determination of exceeding is made, and in steps 108 through 110, setting of a communication error flag, clearing of all receiving buffers (1) through (m), and clearing of the receiving counter is executed, and this processing is exited.

Additionally, if it is determined in step 107 that the number of bytes has not exceeded 11, data that has now been received is stored in receiving buffer (m) in step 111, and along with this, processing of step 112 is executed, and the processing is exited.

Moreover, the processing shown in FIGS. 6 and 7 is performed by the failure-diagnosis tester 5 in addition to the above-described interrupt processing.

In specific terms, firstly it is determined in step 201 whether diagnosis-mode input via the keyboard 5a exists. Consequently, a determination of "existing" is made in this step 201 if immediately subsequently to input of the diagnosis mode through operation of the keyboard 5a by the operator, and a determination of "none" is made at times other thereto.

Accordingly, if a determination of "existing" is made in this step 201, it is determined in step 202 which mode this input diagnosis mode is. Accordingly, if determined hereat to be a mode relating to the above-described latest data-packet continuous-sending diagnosis processing, in step 203 it is determined whether this is a mode to establish a start of latest data-packet continuous-sending diagnosis, or a mode to stop this latest data-packet continuous-sending diagnosis processing.

If determined in this step 203 to be the former, in step 204 a latest- data-packet execution-in-progress flag (hereinafter termed "execution-in-progress flag") which indicates that execution of the latest data-packet continuous-sending diagnosis processing is in progress is set, and in the subsequent step 205, the setting mode (stored in RAM) is set to A1, and execution advances to step 213. Additionally, if determined in the foregoing step 203 to be the latter, in step 206 the foregoing setting mode is set to A3, and execution advances to step 213.

Additionally, if determined to be "none" in the foregoing step 201, it is determined in step 207 whether a subsequent request message has been created after sending the request message, by determining whether a sending counter (which will be described later) is 0. Accordingly, if determined that the sending counter is 0, i.e., that a subsequent request message has not been created after sending the request message, in step 208 it is determined whether the packet execution-in-progress flag has been set. Accordingly, if determined that the foregoing flag has been set hereat, i.e., that execution of latest data-packet continuous-sending diagnosis processing is in progress, in step 209 it is determined which mode the above-described setting mode that is presently set is.

If determined in this step 209 that the setting mode is the above-described A1, in step 210 it is determined whether receipt of a response message corresponding to the packet-definition request message 1 of FIG. 2 has been completed.

Further, in step 210 it is determined whether receipt of the response message has been completed by examining whether data is stored in receiving buffer (1) through the interrupt processing in FIG. 5, and moreover whether the above-described idle counter has exceeded the maximum value (20 ms) of time P1 prescribed by the above-described international standard.

Accordingly, if determined in step 210 that receipt has been completed, the foregoing setting mode is set to A20 in step 211, and execution advances to step 213. Additionally, if determined in the foregoing step 209 to be A20 or A2, the setting mode is set to A2 in step 212, and execution advances to step 213.

Additionally, when determined in step 207 to be NO, or when determined in step 208 that the flag has not been set, or when determined in step 210 that receipt of the response message has not been completed, execution jumps to step 216 in FIG. 7.

In step 213, a request message is created corresponding to the setting mode which was set in any of the foregoing steps 205, 206, 211, and 212.

In specific terms, when the setting mode was set to A1 in step 205, it signifies that the message which will be attempted to be sent hereafter is the packet-definition request message 1, and so the packet-definition request message 1 shown in FIG. 2 is created.

Additionally, when the setting mode was set to A3 in step 206, it signifies that the message which will be attempted to be sent hereafter is the stop request message 4, and so the stop request message 4 shown in FIG. 3 is created.

Additionally, when the setting mode was set to A20 in step 211, it signifies that the message which will be attempted to be sent hereafter is the request message 2, and so the request message 2 shown in FIG. 2 is created.

Additionally, when the setting mode was set to A2 in step 212, it signifies that the message which will be attempted to be sent hereafter is the continuation request message 3, and so the continuation request message 3 shown in FIG. 3 is created.

Additionally, in step 214, the message created in step 213 is stored in sending buffers (1) through (n), and along with this, n is stored to a sending counter which indicates the number of bytes of this message. That is to say, when for example the message created in step 213 is the packet-definition request message 1, this message is stored in sending buffers (1) through (10), and 10 is stored to the sending counter.

Accordingly, in step 216 of FIG. 7, it is determined whether the foregoing sending counter is 0, and if determined to be 0, this routine is exited without further processing. Additionally, when determined not to be 0, in step 217 it is determined whether the packet execution-in-progress flag has been set, and if determined not to have been set, time P3, which is a determination reference value in step 222 which will be described later, is set to the normal value (55 ms).

Additionally, if determined in step 217 to have been set, it is determined in step 218 which is the setting mode. If the setting mode is determined hereat to be A1 or A20, it signifies that the message which will be attempted to be sent hereafter is the packet-definition request message 1 or the request message 2, and so the processing of step 221 is performed.

Additionally, if the setting mode is determined in step 218 to be A3, it signifies that the message which will be attempted to be sent hereafter is the stop request message 4, and so execution jumps to step 220, and time P3 which is the determination reference value in step 222 which will be described later is set to P3' (30 ms).

Additionally, if the setting mode is determined to be A2, it signifies that the message which will be attempted to be sent hereafter is the continuation request message 3, and so in step 219 it is determined whether a time counter for measuring time since completion of sending of the request message 2 or continuation request message 3 has exceeded T1 shown in FIGS. 2 and 3. Accordingly, if determined not to have been exceeded, this routine is exited without further processing, and if determined to have been exceeded, the processing of step 220 is performed.

Moreover, the foregoing time counter is counted up by one in correspondence with a time interrupt (for example, a 32 ms interrupt) by a timer (not shown).

Accordingly, in step 222 it is determined whether the foregoing idle counter exceeded time P3 set in step 220 or step 221; if determined not to have been exceeded, this routine is exited without further processing; if determined to have been exceeded, execution advances to step 223.

In step 223, the request message stored in sending buffers (1) through (n) is sent, and in the subsequent step 224, the sending counter is cleared. Accordingly, in step 225 the idle counter is cleared. That is to say, the idle counter is again counted up from 0. Accordingly, in step 226, it is determined when the packet execution-in-progress flag has been set, and if determined not to have been set, this routine is exited without further processing; if determined to have been set, execution advances to step 227.####

In step 227, it is determined which is the setting mode; if determined hereat to be A1, this routine is exited without further processing; if determined to be A3, in step 228 the packet execution-in-progress flag is cleared and this routine is exited. Additionally, if determined to be A20 or A2, in step 229 the time counter is cleared and this routine is exited. That is to say, the time counter is again counted up from 0.

The several request messages 1 through 4 are sent in the modality shown in FIGS. 2 and 3 by the processing of FIG. 5 through FIG. 7 described hereinabove.

Sending processing of response messages (FIGS. 2 and 3) in the engine controller 1 will be described hereinafter with reference to FIG. 5 and FIG. 8 through FIG. 11. Further, FIGS. 8 through 11 are a flowchart of a main routine which is activated upon every base loop.

Interrupt processing realized through a serial-input interrupt function of the CPU for reliably taking in a request message from the failure-diagnosis tester 5 for which timing of sending is not known is performed in the engine controller 1. Further, this processing is the same as the processing of FIG. 5 described for the failure-diagnosis tester 5, and so description thereof will be omitted.

Additionally, the main routine shown in FIGS. 8 through 11 is activated in the engine controller 1, separately from the foregoing interrupt processing. To describe this routine, firstly, in step 301, it is determined whether the engine controller 1 is presently in the process of receiving a request message from the failure-diagnosis tester 5 by determining whether the counter described in FIG. 5 is 0.

Figure 9:
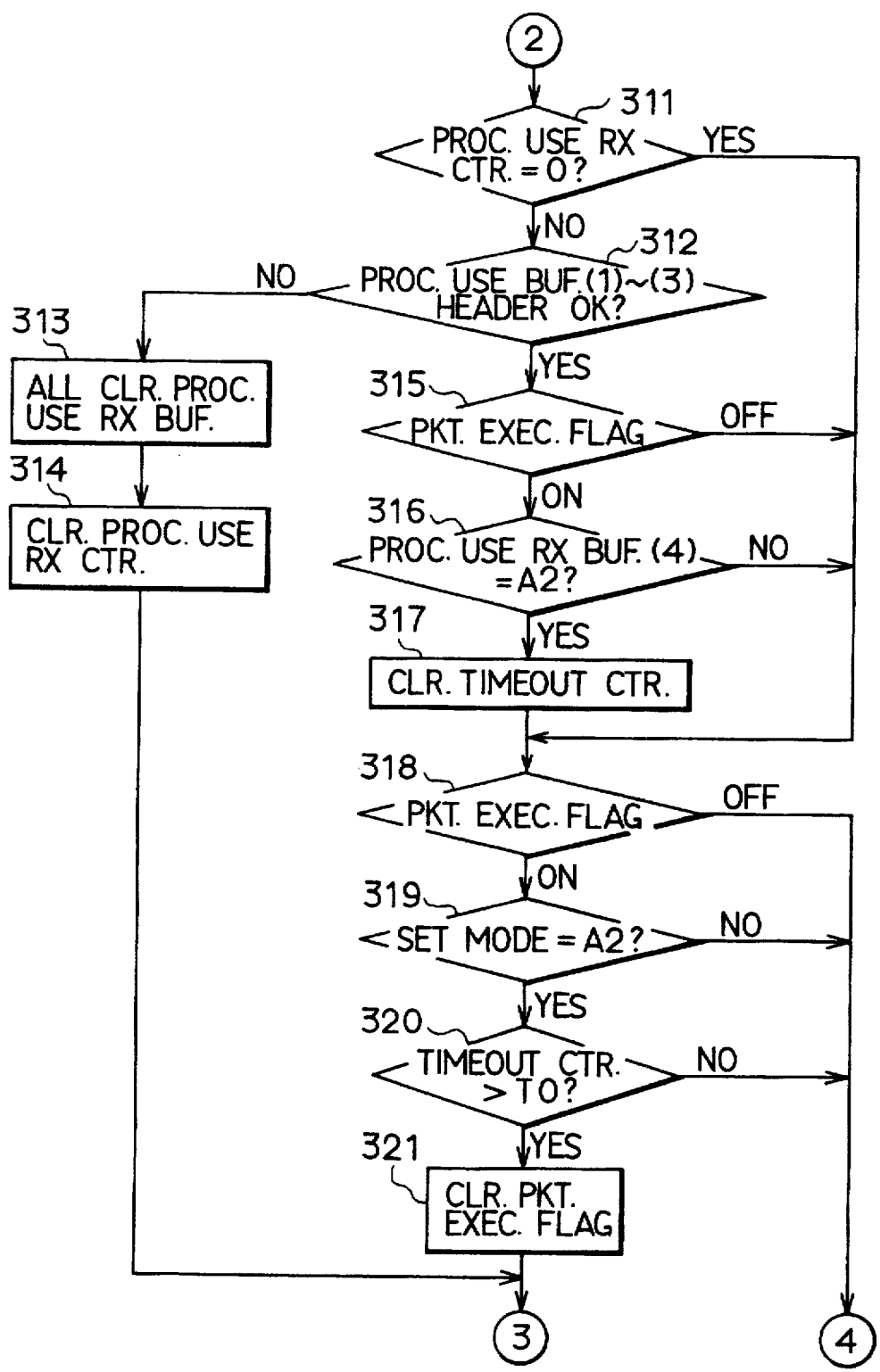
FIG. 9 is a flowchart showing a main routine on the slave side of the first and second embodiments.

If determined hereat to be YES, i.e., not to be in the process of receiving a request message, execution jumps to step 311 in FIG. 9. Conversely, if NO, i.e., if determined to be in the process of receiving a request message, in step 302 it is determined whether receipt of the request message has been completed by determining whether the foregoing idle counter has exceeded the maximum value (20 ms) of time P4 prescribed by the above-described international standard.

If not exceeded hereat, i.e., if determined to be still in the process of receiving the request message, execution jumps to step 311. Conversely, if exceeded, i.e., if determined that receipt of the request message has been completed, a sum check of the message is performed in the following steps 303 through 305.

In this sum check, firstly, in step 303, the length in bytes of the received message is confirmed on a basis of the count value of the receiving counter. Accordingly, the sum of the data stored in the receiving buffers (1) through (n−1) is calculated in the subsequent step 304 on a basis of this numerical value, and in the final step 305, it is determined whether data of the lower 8 bits of this sum value matches the data stored in the receiving buffer (n), i.e., the CS value.

If determined as a result of this sum check that the foregoing values do not match, it is considered to be an abnormality, and a communication error flag is set in step 306, all receiving buffers are cleared in step 307, the receiving counter is cleared in step 308, and execution advances to step 311 in FIG. 9.

Additionally, if the result of the above-described sum check is normal, it is determined that there is no problem in the receiving data, and in step 309 the data stored in the receiving buffers (1) through (n) is copied to receiving buffers for processing use (1) through (n) employed for response-message creation and sending. Accordingly, in the subsequent step 310, the receiving counter is similarly copied to a receiving counter for processing used employed for response-message creation and sending. Accordingly, execution is transferred to the processing of step 307.

In step 311 of FIG. 9, it is determined whether immediately subsequent to receiving the request message by determining whether the foregoing receiving counter for processing use is 0. If determined hereat to be NO, i.e., not immediately subsequent to receiving the request message, execution advances to step 312; conversely, if determined to be YES, execution jumps to step 318.

In step 312, it is determined whether the contents of receiving buffers (1) through (3), i.e., the message header of the received request message, is normal. If determined hereat not to be normal, in step 313 the data stored in the receiving buffers for processing use (1) through (n) is all cleared, and in the subsequent step 314, the foregoing receiving counter for processing use is cleared, and this main routine is exited.

Additionally, if determined in step 312 to be normal, in the subsequent step 315 it is determined whether the packet execution-in-progress flag in the engine controller 1 has been set. If determined hereat to have been set, execution advances to step 316; if determined to be off, execution jumps to step 318. Further, to packet execution-in-progress flag is caused to be off in an initial state wherein the ignition switch 18 has been switched on and the power source has initially been supplied to the engine controller 1.

In step 316, it is determined whether the data stored in the receiving buffer for processing use (4) is A2. That is to say, it is determined whether the request message that has now been received is the request message 2 or the continuation request message 3. If determined hereat to be NO, execution jumps to step 318; conversely, if determined to be YES, in step 317 a timeout counter for measuring the above-described time TO (FIGS. 2 and 3) is cleared.

Further, the foregoing timeout counter is counted up by one in correspondence with a time interrupt (for example, a 32-ms interrupt) by a timer (not shown).

That is to say, being determined to be NO in step 311, and moreover being determined to be YES in step 316, signifies being immediately subsequent to having received the request message 2 or continuation request message 3, and so in step 317 the timeout counter is cleared.

Figure 10:
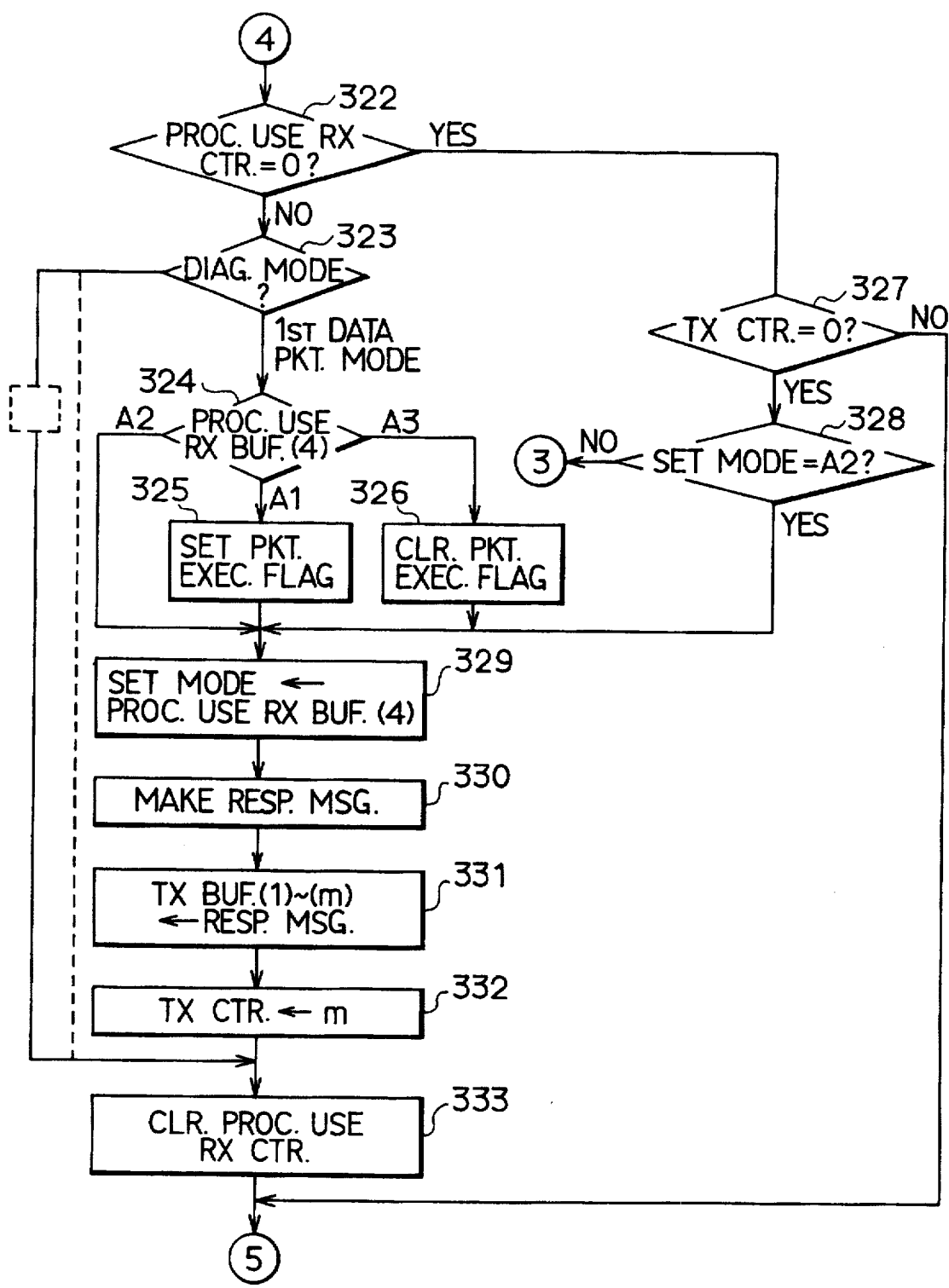
FIG. 10 is a flowchart showing a main routine on the slave side of the first and second embodiments.

In step 318, it is determined whether the packet execution-in-progress flag has been set, and if determined not to have been set, execution jumps to step 322 in FIG. 10; if determined to have been set, execution advances to step 319. In step 319, it is determined whether the presently set setting mode is A2, i.e., whether the most recently received request message is the request message 2 or the continuation request message 3. Further, this setting mode is set in step 329 to be described later.

In the foregoing step 319, execution advances to step 322 of FIG. 10 if determined that the setting mode is not A2; execution advances to step 320 if determined that the setting mode is A2. In this step 320, it is determined whether the above-described timeout counter has exceeded TO. If determined hereat not to have been exceeded, execution advances to step 322. Conversely, if determined to have been exceeded, it signifies that the subsequent continuation request message was not sent within the foregoing time T0 because for example the connection of the diagnosis connector 4 was disconnected or the like, and so to cause the latest data-packet continuous-sending diagnosis processing to be stopped, in step 321 the packet execution-in-progress flag is cleared, and this main routine is exited.

In step 322, the same determination as the above-described step 311 is performed once more. If determined hereat to be NO, it is determined which mode is the diagnosis mode which has now been sent from the failure-diagnosis tester 5. Accordingly, if determined to be a mode relating to the latest data-packet continuous-sending diagnosis processing, it is determined, on a basis of the data stored in the receiving buffer for processing use (4), which message is the request message that has now been sent.

In step 324, if determined that the data stored in the receiving buffer for processing use (4) is A1, it signifies that the message which has now been sent is the packet-definition request message 1, and so in step 325 the packet execution-in-progress flag is set so that latest data-packet continuous-sending diagnosis processing is performed hereinafter, and execution is transferred to step 329.

Additionally, in step 324, if determined that the data stored in the receiving buffer for processing use (4) is A3, it signifies that the message which has now been sent is the stop request message 4, and so the packet execution-in-progress flag is cleared with the same object as when in the foregoing step 321, and execution is transferred to step 329.

Additionally, in step 324, if determined that the data stored in the receiving buffer for processing use (4) is A2, it signifies that the message which has now been sent is the request message 2 or the continuation request message 3, and so execution is transferred to step 329 without further processing.

In step 329, the data stored in the receiving buffer for processing use (4) is set as the foregoing setting mode.

Accordingly, in step 330, a response message is created in accordance with the setting mode set in the foregoing step 329.

In specific terms, when the setting mode has been set to A1 in step 329, it signifies that the message which will be attempted to be sent hereafter is a response message for the packet-definition request message 1, and so a response message such as shown FIG. 2 is created.

Additionally, when the setting mode has been set to A2 in step 329, it signifies that the message which will be attempted to be sent hereafter is a response message for the request message 2 or continuation request message 3, and so a response message such as shown FIG. 2 or 3 is created.

Additionally, when the setting mode has been set to A3 in step 329, it signifies that the message which will be attempted to be sent hereafter is a response message for the stop request message 4, and so a response message such as shown FIG. 3 is created.

In step 331, the response message created in the foregoing step 330 is stored in the sending buffers (1) through (m), and along with this, in step 332 m indicating the byte length of this message is stored to the sending counter. That is to say, when for example the message created in step 330 is a response message for the packet-definition request message 1, this message is stored in the sending buffers (1) through (10), and 10 is stored to the sending counter.

Figure 11:
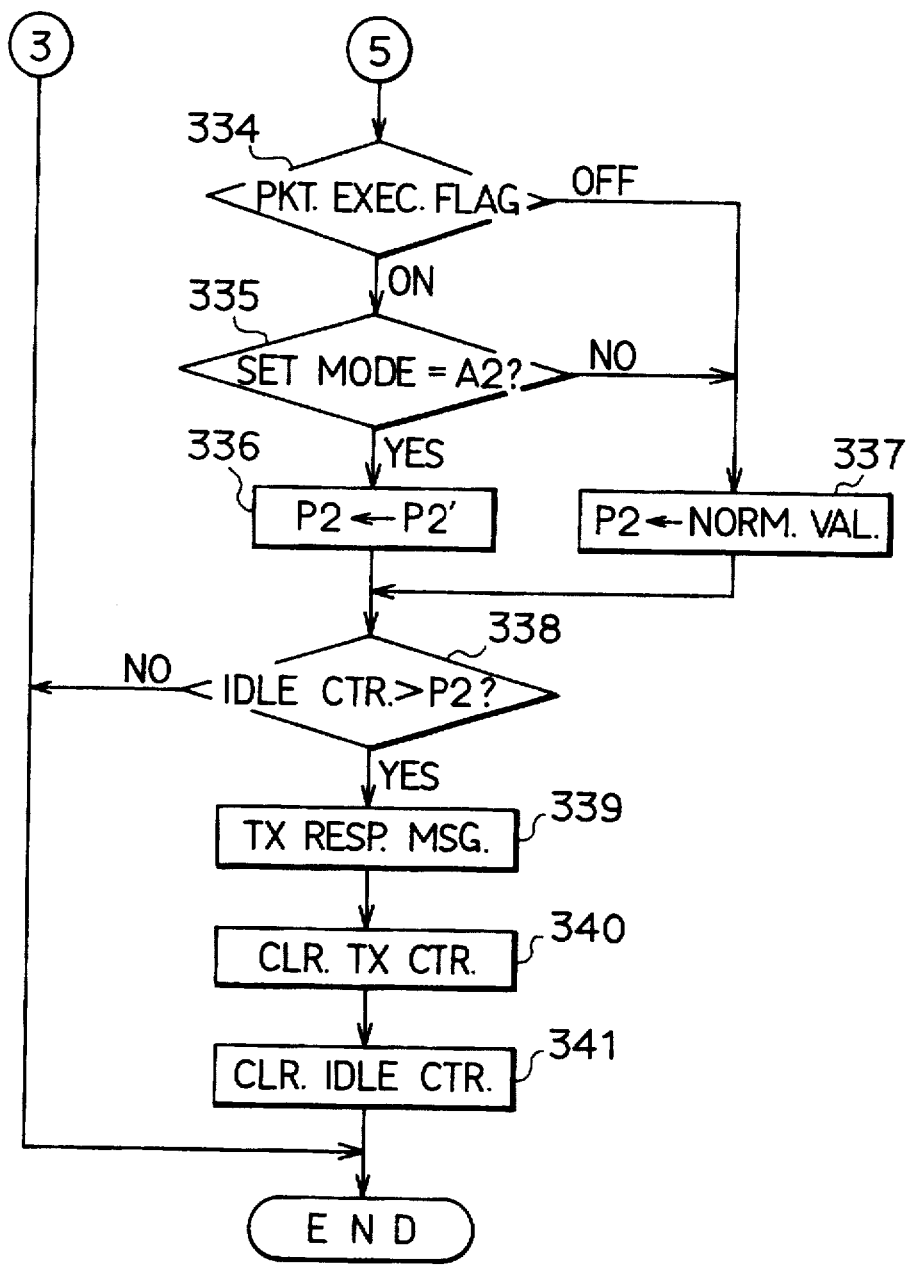
FIG. 11 is a flowchart showing a main routine on the slave side of the first embodiment.

Accordingly, in step 333, the receiving counter for processing use is cleared, and execution is transferred to step 334 in FIG. 11.

Meanwhile, if determined in the foregoing step 322 to be YES, in step 327 it is determined whether the subsequent response message after sending of the response message has not been created by determining whether the sending counter is 0.

If determined in this step 327 to be NO, i.e., that the subsequent response message has already been created, execution jumps to step 334 in FIG. 11. Conversely, if determined to be YES, i.e., that the subsequent response message has not yet been created, in the subsequent step 328 it is determined, on a basis of the setting mode that is now presently set, whether creation of the subsequent response message is necessary.

That is to say, in step 328, it is determined whether the presently set setting mode is A2, i.e., whether the most recently received request message is the request message 2 or the continuation request message 3. Accordingly, if determined to be YES, a response message must be continuously sent, as shown in FIGS. 2 and 3, and so it is determined that the subsequent response message must be created and execution advances to step 329.

Conversely, if determined to be NO, a response message no longer need be created, and so this routine is exited without further processing. Further, a time when the processing of this step 328 is performed after a response message has been sent with respect to the packet-definition request message 1 and a time when the processing of this step 328 is performed after a response message has been sent with respect to the packet-definition request message 1 exist as times when determined to be NO in step 328.

In step 334 of FIG. 11, it is determined whether the packet execution-in-progress flag has been set. Accordingly, if determined not to have been set, in step 337 the time P2 which is the determination reference value in step 338 to be described later is set to the normal value (28 ms).

Additionally, if determined in the foregoing step 334 that the flag has been set, in step 335 it is determined whether the setting mode now presently set is A2; if determined to be NO, execution is transferred to step 337; if determined to be YES, in step 336 the time P2 which is the determination reference value in step 338 to be described later is set to P2' (40 ms).

If time P2 was set in the foregoing step 336 or 337, in step 338 it is determined whether the above-described idle counter exceeded this time P2. If determined hereat to be NO, this routine is exited without further processing. Additionally, if determined to be YES, in step 339 the response message stored in the sending buffers (1) through (m) is sent, in step 340 the sending counter is cleared, in step 341 the idle counter is cleared, and this routine is exited.

The several response messages are sent in the modality shown in FIGS. 2 and 3 by the processing of FIG. 8 through FIG. 11 described hereinabove.

Moreover, the several steps shown in FIG. 5 through FIG. 11 make up means for realizing the respective functions.

As described hereinabove, the present embodiment was set so that the continuation request message 3 or stop request message 4 is sent after the idle counter passed time P3' (<P2'), and so the continuation request message 3 or stop request message 4 can be sent prior to the subsequent response message being sent, without causing mutual collision of messages on the communication line 3.

A second embodiment based on the invention of claim 1, 3, or 6 will be described next. Further, overall structure of the present embodiment, and bit format of the several bytes making up the several messages, are as shown in FIG. 1 and FIG. 4 described for the first embodiment, and so description thereof will be omitted.

Figure 12:
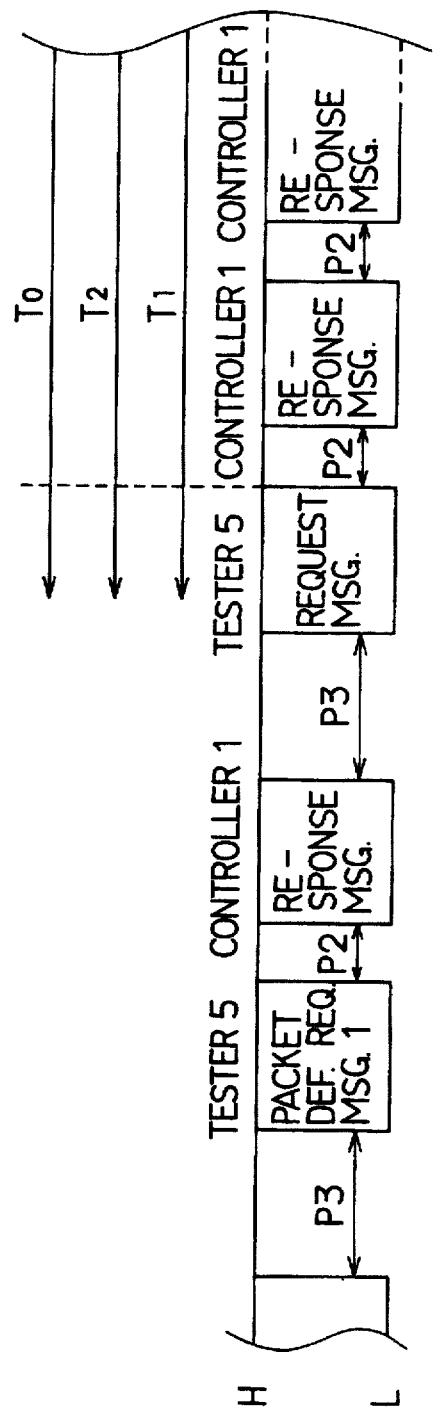
FIG. 12 is a time chart showing overall flow of latest data-packet continuous-sending diagnosis processing of the second embodiment.
Figure 13:
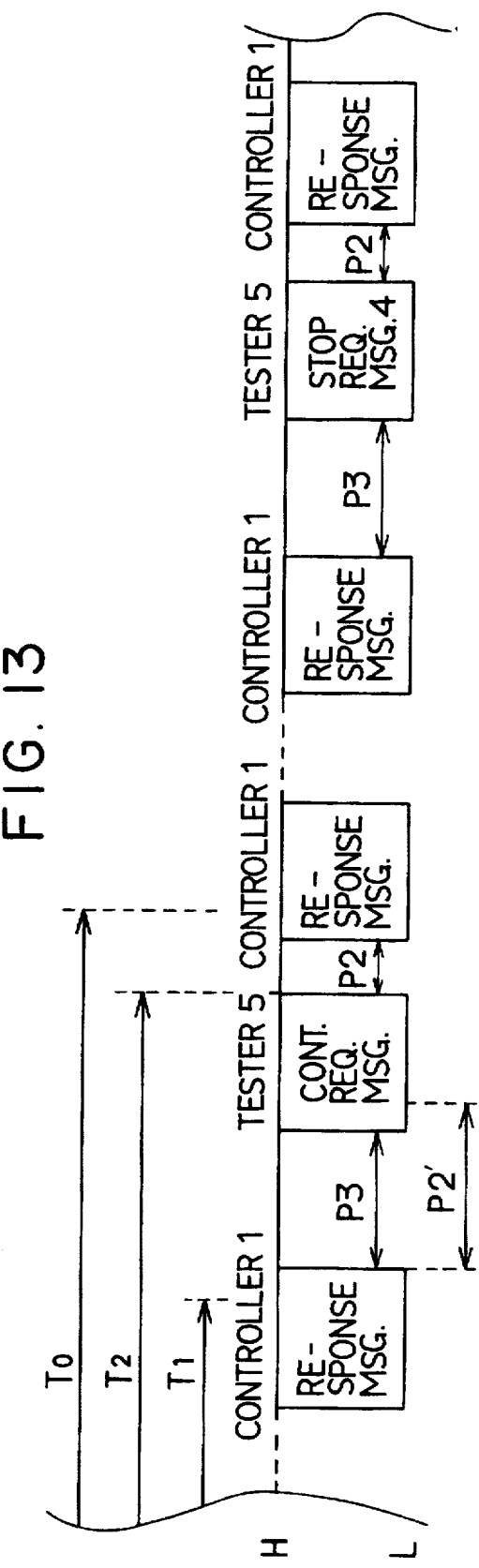
FIG. 13 is a time chart showing overall flow of latest data-packet continuous-sending diagnosis processing of the second embodiment.

In FIG. 12 and FIG. 13, overall flow of latest data-packet continuous-sending diagnosis processing of the present embodiment is shown as a time chart. A case of the failure-diagnosis tester 5 and engine controller 1 performing one-to-one communication, similarly to the first embodiment, will be described herein.

As can be understood from FIG. 12 and FIG. 13 as well, the overall flow of the foregoing processing of the present embodiment is substantially the same as a case of the first embodiment, but the point that a condition under which a response is sent is taken to be a time when the idle counter has passed time P2' (>P3) when the foregoing time counter T1 has exceeded T1 after completion of sending of the request message 1 or continuation request message 3, or is taken to be a time when the idle counter has passed time P2 at any other time, and the point that conditions under which the point that the foregoing several messages 1 through 4 are sent are all taken to be the same (a time when the idle counter has passed time T3) differ from the first embodiment.

Specific means for performing this above-described processing will be described hereinafter with reference to FIG. 5, FIG. 6, FIGS. 8 through 10, FIG. 14, and FIG. 15.

The failure-diagnosis tester 5 and engine controller 1 perform interrupt processing (FIG. 5) realized through a serial-input interrupt function of the CPU for reliably taking in a response message or request message for which timing of sending is not known.

Additionally, the failure-diagnosis tester 5 performs, separately from the foregoing interrupt processing, a main routine (FIG. 6 and FIG. 14) which is activated upon every base loop. Further, in this processing, the same symbols as for the first embodiment have been added with regard to steps to perform the same processing as for the first embodiment, and so description thereof will be omitted. Consequently, only steps which differ from the first embodiment will be described.

Figure 14:
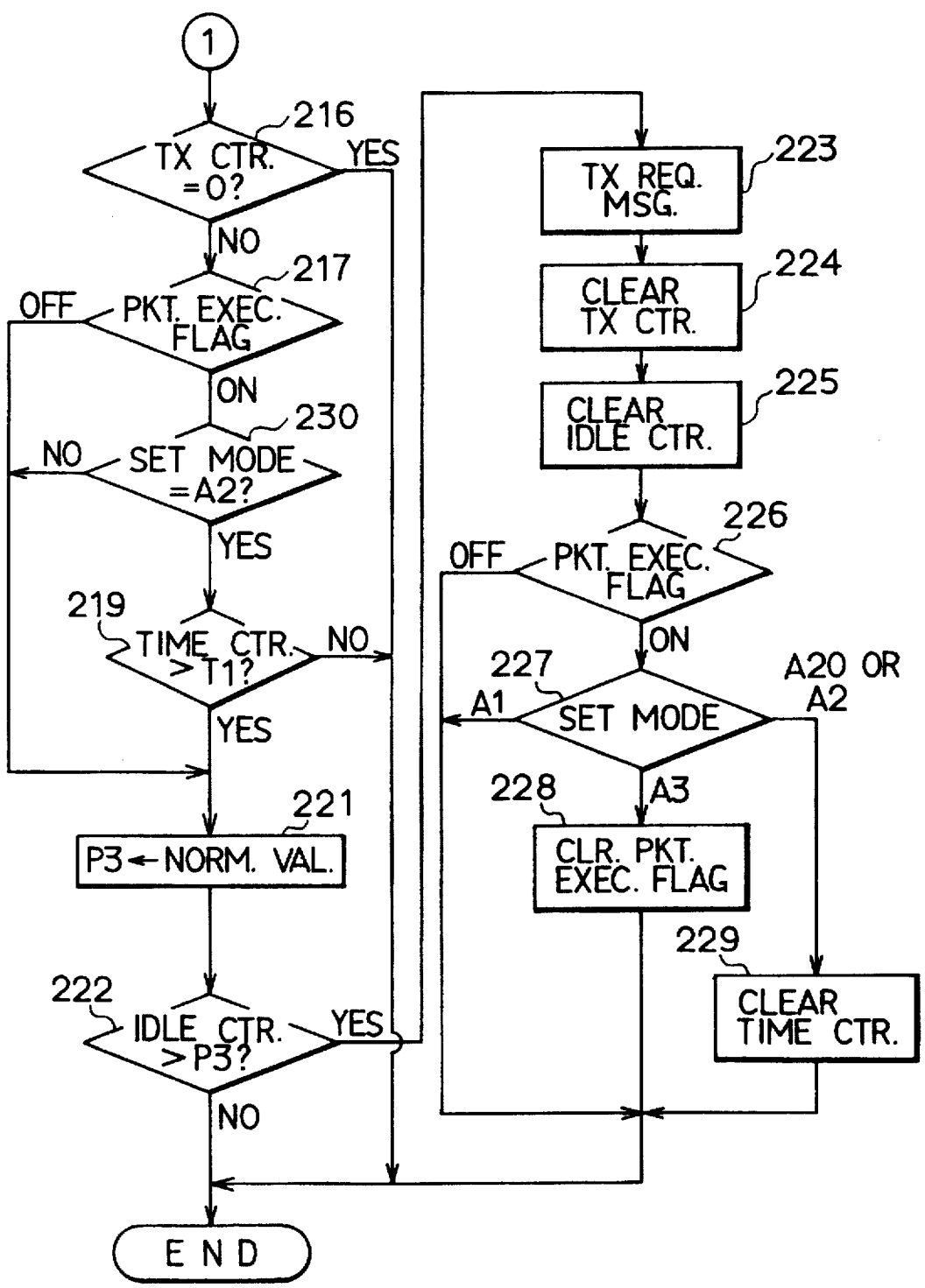
FIG. 14 is a flowchart showing a main routine on the master side of the second embodiment.

As shown in FIG. 14, if determined in step 217 that the packet execution-in-progress flag has been sent, in step 230 it is determined whether the setting mode is A2. Accordingly, if determined to be A2, execution advances to step 219; if determined to be otherwise (either A1, A3, or A20), in step 221 time P3 is set to the normal value 55 ms).

The several request messages 1 through 4 are sent in the modality shown in FIGS. 12 and 13 by the processing of the foregoing FIG. 6 and FIG. 14.

In contrast thereto, the engine controller 1 performs, separately from the foregoing interrupt processing, a main routine (FIGS. 8 through 10 and FIG. 15) which is activated upon every base loop. Further, in this processing, the same symbols as for the first embodiment have been added with regard to steps to perform the same processing as for the first embodiment, and so description thereof will be omitted. Consequently, only steps which differ from the first embodiment will be described.

Figure 15:
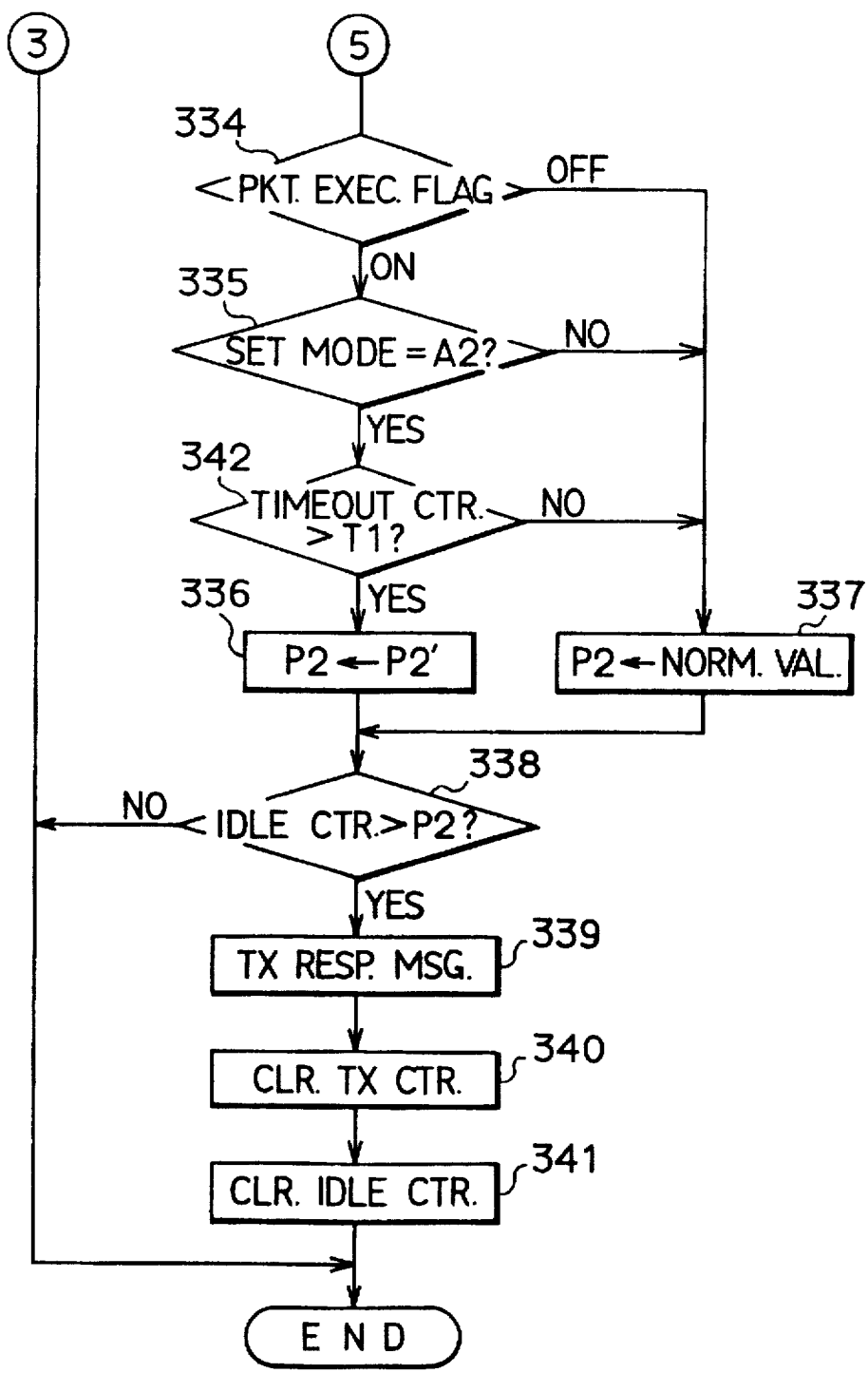
FIG. 15 is a flowchart showing the main routine on the slave side of the second embodiment.

As shown in FIG. 15, if determined in step 335 that the setting mode is A2, in step 342 it is determined whether the above-described timeout counter has exceeded time T1. Accordingly, if determined to have been exceeded, in step 336 time P2 is set to P2' (according to the present embodiment, 70 ms); if determined not to have been exceeded, in step 337 time P2 is set to the normal value (28 ms).

The several response messages are sent in the modality shown in FIGS. 12 and 13 by the processing of the foregoing FIGS. 8 through 10 and FIG. 15.

The second embodiment described hereinabove was set so that the subsequent response message is sent after the idle counter passed time P2' (>P3) when the timeout counter exceeded time T1, and so the continuation request message 3 can be sent prior to the subsequent response message being sent, without causing mutual collision of messages on the communication line 3.

Additionally, the present embodiment was such that the several response messages are sent after the idle counter passes P2 (<P2') until the timeout counter exceeds time T1, and so communication speed with respect to these response messages can be hastened in comparison with the first embodiment.

Further, according to the foregoing several embodiments, the failure-diagnosis tester 5 can also perform one-to-one communication such as is described above not only with the engine controller 1, but also with another electronic controller (for example the transmission controller 2).

Additionally, according to the foregoing several embodiments, respective times were variously set with regard to times P2, P2', P3, and P3', but in essence, it is sufficient if the idle counter (P3 of step 222) taken to be necessary for sending the continuation request message 3 is caused to become shorter than the idle counter (P2 of step 338) taken to be necessary for the response message which is sent subsequently to the response message sent immediately prior to this continuation request message 3 to be sent.

(Other embodiments)

According to the foregoing several embodiments, a system wherein the failure-diagnosis tester 5 was taken to be the master device and an electronic controller was taken to be the slave device was described, but application with respect to a system wherein a desired one from among a plurality of electronic controllers is caused to be the master device and another electronic controller is caused to be the slave device is also possible.

Additionally, according to the foregoing embodiment, a case where a communication system according to the present invention was employed in a vehicle was described, but application in other than a vehicle is also possible.

We claim:

1. A communication system, comprising:
    a master device and a slave device connected by a transmissible bidirectional communication line, wherein:
    said master device is structured to send on said communication line a request message for causing a response message from said slave device to be continuously sent, and along with this, also to send, within a predetermined time from sending of this request message, a continuation message to cause said continuous sending to be continued; and
    said slave device is structured so that when said request message or said continuation message has been received, said slave device continuously sends said response message on said communication line within a predetermined time from this receipt, wherein further:
    said slave device is structured so that at a time when said slave device continuously sends said response message, said slave device sends a subsequent response message after confirming that said communication line has been continuously open for a first idle time or longer; and
    said master device is structured to send said continuation message after confirming that said communication line has been continuously open for not less than a second idle time which is shorter than said first idle time.

2. A communication system according to claim 1, wherein:
    said slave device comprises:
    means for determining first idle time to determine whether said communication line has been continuously open for said first idle time or longer; and
    means for response-message sending to send said subsequent response message when it has been determined by this means for determining first idle time that said communication line has been open for said first idle time or longer, wherein further:
    said master device comprises:
    means for determining elapsed time to determine whether not less than a second predetermined time which is shorter than said predetermined time has elapsed after completion of sending said request message or said continuation message;
    means for setting a reference value to set a reference value for determining open time of said communication line to said second idle time after it has been determined by this elapsed-time determining means that said second predetermined time or longer has elapsed;
    means for determining second idle time to determine whether said communication line has been continuously open for said reference value or more; and
    means for continuation-message sending to send said continuation message after it has been determined by this means for determining second idle time that said communication line has been continuously open for said reference value or more.

3. A communication system according to claim 1, wherein:
    said slave device comprises:
    means for determining elapsed time to determine whether not less than a second predetermined time which is shorter than said predetermined time has elapsed after completion of sending said request message or said continuation message;
    means for setting a reference value to set a reference value for determining open time of said communication line to said first idle time after it has been determined by this elapsed-time determining means that said first predetermined time or longer has elapsed;
    means for determining first idle time to determine whether said communication line has been continuously open for said reference value or more; and
    means for response-message sending to send said subsequent response message when it has been determined by this means for determining first idle time that said communication line has been open for said first idle time or longer, wherein further:
    said master device comprises:
    means for determining second idle time to determine whether said communication line has been continuously open for said reference value or more; and
    means for continuation-message sending to send said continuation message after it has been determined by this means for determining second idle time that said communication line has been continuously open for said reference value or more.

4. A communication system, comprising:
    a master device and a slave device connected by a transmissible bidirectional communication line, wherein:
    said master device is structured to send on said communication line a request message for causing a response message from said slave device to be continuously sent, and along with this, also to send, after sending this request message, a stop message to cause said continuous sending to be stopped; and
    said slave device is structured so that when said request message has been received, said slave device continuously sends said response message on said communication line within a predetermined time from this receipt, and along with this, stops said continuous sending when said stop message has been received, wherein further:
    said slave device is structured so that at a time when said slave device continuously sends said response message, said slave device sends a subsequent response message after confirming that said communication line has been continuously open for a first idle time or longer; and said master device is structured to send said stop message after confirming that said communication line has been continuously open for not less than a second idle time which is shorter than said first idle time.

5. A communication system according to claim 4, wherein:

said slave device comprises:

means for determining first idle time to determine whether said communication line has been continuously open for said first idle time or longer; and means for response-message sending to send said subsequent response message when it has been determined by this means for determining first idle time that said communication line has been open for said first idle time or longer, wherein further:

said master device comprises:

means for determining second idle time to determine whether said communication line has been continuously open for said second idle time or longer; and means for stop-message sending to send said stop message after it has been determined by this means for determining second idle time that said communication line has been continuously open for said second idle time or longer.

6. A communication system according to any one of claims 1 through 5, wherein further:

a plurality of said slave devices are provided;

said master device is structured to select from among this plurality of slave devices a desired slave device, and along with this, to send said request message or said continuation message or said stop message to this selected slave device; and said selected slave device is structured to continuously send said response message.

7. A communication system according to claim 1, wherein:

said slave device terminates continuous sending of said response message at a time when a present continuation message has not been received before elapse of said predetermined time after receipt of a prior continuation message.

8. A communication system according to claim 1, wherein:

said master device sends a prior request message at a time when a response message has been received from said slave device with respect to a data-definition request message to determine data of said response message.

9. A communication system, comprising:

a second communication device to send after elapse of a first idle time a response message, corresponding to a request message received from a first communication device via a single transmissible bidirectional communication line, on said communication line, and along with this, to repeatedly continuously send, after receipt of a continuation message, said response message to said first communication device for a predetermined time at each elapse of said first idle time, wherein:

said second communication device comprises:

means for determining elapsed time to determine whether not less than a second predetermined time which is shorter than said predetermined time has elapsed after completion of sending said request message or said continuation message;

means for setting a reference value to set a reference value to greater than said first idle time after it has been determined by this elapsed-time determining means that said second predetermined time or longer has elapsed; means for determining idle time to determine, when continuously sending said response message, whether said communication line has been continuously open for said reference value or more; and means for response-message sending to send a subsequent response message after it has been determined by this means for determining idle time that said communication line has been continuously open for said reference value or more.

10. A communication system according to claim 9, wherein further:

said second communication device stops sending being executed when said continuation message has not been received for said predetermined time, or when a stop message to request stopping of sending being executed has been received.

* * * * *